(12) United States Patent
Du et al.

(10) Patent No.: US 12,474,470 B2
(45) Date of Patent: Nov. 18, 2025

(54) METHOD FOR SENSING SNEEZING BASED ON WIRELESS SIGNAL, AND RELATED APPARATUS

(71) Applicant: Huawei Technologies Co., Ltd., Shenzhen (CN)

(72) Inventors: Rui Du, Shenzhen (CN); Wen Tong, Ottawa (CA); Xiao Han, Shenzhen (CN); Mingjie Dong, Shenzhen (CN); Danny Kai Pin Tan, Shenzhen (CN); Yingxiang Sun, Shenzhen (CN); Xiaohui Peng, Shenzhen (CN); Xun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 299 days.

(21) Appl. No.: 18/160,466

(22) Filed: Jan. 27, 2023

(65) Prior Publication Data

US 2023/0168372 A1    Jun. 1, 2023

Related U.S. Application Data

(63) Continuation of application No. PCT/CN2021/107962, filed on Jul. 22, 2021.

(30) Foreign Application Priority Data

Jul. 29, 2020  (CN) .......................... 202010746355.0

(51) Int. Cl.
*G01S 15/89*  (2006.01)
*G01S 7/41*  (2006.01)

(52) U.S. Cl.
CPC .......... *G01S 15/8979* (2013.01); *G01S 7/414* (2013.01)

(58) Field of Classification Search
CPC ........ G01S 15/8979; G01S 7/414; G01S 7/41; G01S 13/003; G01S 13/88; G01S 13/56;
(Continued)

(56) References Cited

U.S. PATENT DOCUMENTS 3,878,526 A * 4/1975 Pedersen ............... G01S 13/585
342/194
2013/0165793 A1 * 6/2013 Kim ....................... A61B 8/488
600/453

(Continued)

FOREIGN PATENT DOCUMENTS

CN    103308934 A    9/2013
CN    105517493 A    4/2016
(Continued)

OTHER PUBLICATIONS

Tan, "Exploiting WiFi channel state information for residential healthcare informatics". In: IEEE Communications Magazine 56.5 (2018), pp. 130-137. (Year: 2018).*

(Continued)

*Primary Examiner* — Juan A Torres
(74) *Attorney, Agent, or Firm* — Conley Rose, P.C.

(57) ABSTRACT

A method for sensing sneezing based on a wireless signal includes obtaining a wireless signal, where the wireless signal propagates in space including a first object. Doppler estimation is performed on the wireless signal, to obtain Doppler information of the wireless signal. The Doppler information of the wireless signal may be used for indicating impact of the first object on a frequency of the wireless signal. Whether the first object is sneeze droplets is determined based on the Doppler information of the wireless signal.

20 Claims, 14 Drawing Sheets

(58) Field of Classification Search
CPC ........ G06N 3/0464; G06N 3/09; G06N 3/045; F24F 11/63; F24F 2120/20; H04W 4/021; H04W 4/33; H04W 4/023; H04W 4/30
USPC ...................................................... 455/456.1
See application file for complete search history.

(56) References Cited

U.S. PATENT DOCUMENTS

| | | | |
|---|---|---|---|
| 2016/0239954 A1 | 8/2016 | Masoudi | |
| 2018/0041262 A1* | 2/2018 | Kang | .................. H04B 7/0617 |
| 2019/0020425 A1* | 1/2019 | Zhang | ............... H04W 56/0035 |

FOREIGN PATENT DOCUMENTS

| | | |
|---|---|---|
| CN | 107343315 A | 11/2017 |
| GB | 2463774 A | 3/2010 |
| WO | 2019239812 A1 | 12/2019 |

OTHER PUBLICATIONS

Liu, "Monitoring vital signs and postures during sleep using WiFi signals". In: IEEE Internet of Things Journal 5.3 (2018), pp. 2071-2084. (Year: 2018).*

Liu, "Tracking vital signs during sleep leveraging off-the-shelf wifi". In: Proceedings of the 16th ACM International Symposium on Mobile Ad Hoc Networking and Computing. 2015, pp. 267-276. (Year: 2015).*

Zhao, "R-DEHM: CSI-based robust duration estimation of human motion with WiFi". In: Sensors 19.6 (2019), p. 1421. (Year: 2019).*

European search opinion dated Oct. 9, 2023 for EP 21849813. (Year: 2023).*

Amended claims with annotations dated Mar. 24, 2025 for EP 21849813. (Year: 2025).*

Du, R., et al., "WLAN sensing usage model:sneeze sensing," IEEE 802.11-20/1640r0, Oct. 13, 2020, 13 pages, XP068173757.

Pu, Q., et al., "Whole-Home Gesture Recognition Using Wireless Signals," ACM, Sep. 3, 2013, 12 pages.

Tan D.K., et al., "Wi-Sneeze-Sneeze Sensing using Wi-Fi Signals," 2020 IEEE Globecom Workshops, Dec. 1, 2020 6 pages, XP093085289.

Taylor, W. et al., "A Review on the State of the Art in Non Contact Sensing for COVID-19," ResearchGate, arXiv:2007.16063v1 [cs.CY], Jul. 2020, 11 pages.

Lin, Y. et al., "A Feature Directly Extracted from Intrinsic Mode Functions," Nanjing Research Institute of Electronic Technology, Nanjing, P.R.C., 2017, 6 pages.

IEEE Std 802.11 2013 "IEEE Standard for Information technology, Telecommunications and information exchange between systems Local and metropolitan area networks, Specific requirements, Part 11: Wireless LAN Medium Access Control, Amendment 4: Enhancements for Very High Throughput for Operation in Bands below 6 GHz, (MAC) and Physical Layer (PHY) Specifications," Dec. 11, 2013, 425 pages.

IEEE 802.11-15/0579, Zhang, H. et al., "802.11ax Preamble Design and Auto-Detection," Jul. 2015, 7 pages.

IEEE 802.11be, Wikipedia, URL: https://en.wikipedia.org/w/index.php?title=IEEE_802.44be&oldid=1095674220, Last edited on Jun. 29, 2022, 4 pages.

* cited by examiner

METHOD FOR SENSING SNEEZING BASED ON WIRELESS SIGNAL, AND RELATED APPARATUS

CROSS-REFERENCE TO RELATED APPLICATIONS

This is a continuation of International Patent Application No. PCT/CN2021/107962 filed on Jul. 22, 2021, which claims priority to Chinese Patent Application No. 202010746355.0 filed on Jul. 29, 2020. The disclosures of the aforementioned applications are hereby incorporated by reference in their entireties.

TECHNICAL FIELD

This disclosure relates to the field of wireless communication technologies, and in particular, to a method for sensing sneezing based on a wireless signal, and a related apparatus.

BACKGROUND

Wireless local area network (WLAN) sensing is a technology with broad application prospects. The WLAN sensing is to sense surrounding environments by using a radio frequency (RF) signal sent by a WLAN device, and extract corresponding parameters in a received signal for analysis by using a specific algorithm, to obtain related information about the surrounding environments. Widely deployed WLAN infrastructures (such as WLAN devices) can be used for the WLAN sensing to implement environment sensing. For example, in home security protection, a WLAN device deployed in an environment may continuously detect and obtain channel state information of the environment, and monitor, in real time by analyzing and comparing a large amount of data, whether exceptions exist in the environment, to ensure home security. For another example, in hospital medical treatment, a specific quantity of WLAN devices may be deployed in a specific monitoring area. Biometric information such as a heartbeat and a temperature of a patient is sensed and measured by using a WLAN signal or a specific data signal, to monitor in real time an area in which the patient is located.

Sneezing or coughing, as a common accompanying symptom of respiratory diseases, is a key manner of virus spreading. In particular, droplets generated by sneezing or coughing and subsequent aerosols including viruses may stay for more than several hours in environments with poor air mobility such as indoors. This causes potential dangers. Therefore, a sneezing/coughing location of a potential infected person is recognized by recognizing and locating actions such as sneezing/coughing, and a range of aerosols that includes a high concentration of viruses and that may be generated around is determined. This can help to avoid potential risk areas, and block virus spreading to some extent.

Sneezing can be recognized by using a sound signal or a camera. Further, sneezing can be recognized by using a collected sound signal due to a special sound feature of sneezing. However, the method of recognizing sneezing by using the sound signal is susceptible to environmental noise, and "droplets", that is, another feature of sneezing, cannot be detected. Sneezing is recognized by using a camera. With help of a high-definition camera, artificial intelligence may be used for implementing vision-based sneezing detection and, to some extent, droplet detection. However, the method of recognizing sneezing by using the camera is susceptible to external lighting conditions and obstructions. Consequently, all-weather sensing cannot be implemented.

SUMMARY

Embodiments of this disclosure provide a method for sensing sneezing based on a wireless signal, and a related apparatus. Existing WLAN devices may be used for performing signal processing on a wireless signal, to detect sneeze droplets from sneezing without being affected by light and noise in an environment.

The following describes this disclosure from different aspects. It should be understood that mutual reference may be made to the following implementations and beneficial effects of the different aspects.

According to a first aspect, this disclosure provides a method for sensing sneezing based on a wireless signal. The method may be applied to an access point/a station in a WLAN or a cloud computing center. The method includes obtaining a wireless signal, performing Doppler estimation on the wireless signal, to obtain Doppler information of the wireless signal, and determining, based on the Doppler information of the wireless signal, whether a first object is sneeze droplets. The wireless signal propagates in space including the first object. The Doppler information of the wireless signal may be used for indicating impact of the first object on a frequency of the wireless signal. The first object may be droplets, small water droplets in the space, or the like.

Optionally, the Doppler information may include a time-Doppler spectrum, a range-Doppler-time spectrum, or Doppler information in another dimension.

In this solution, sneeze droplets are recognized by using special impact of the sneeze droplets on Doppler information of a wireless signal, to recognize whether sneezing exists. This process may not be affected by light, noise, and an obstruction in an environment. This can improve applicability of droplet detection.

With reference to the first aspect, in a possible design, the wireless signal further propagates in space including a second object. The Doppler information of the wireless signal may be further used for indicating impact of the second object on the frequency of the wireless signal. The impact of the first object on the frequency of the wireless signal is different from the impact of the second object on the frequency of the wireless signal. The method may further include determining, based on the Doppler information of the wireless signal, whether the second object is a sneezing action. The second object may be a body action of a person.

In this solution, a plurality of objects in space may have different impact on the Doppler information of the wireless signal, and the impact may be used for recognizing the plurality of objects. This can implement both sneeze droplet recognition and sneezing action recognition. The sneeze droplets and the sneezing action are jointly recognized, to reduce a misjudgment.

With reference to the first aspect, in a possible design, after obtaining a wireless signal, the method further includes performing angle-of-arrival estimation, range estimation, and Doppler estimation on the wireless signal, to obtain spatial location information of the first object and spatial location information of the second object. The spatial location information of the first object includes a first angle of arrival of a wireless signal that is reflected by the first object and that is relative to a receiving device, and a first range between the first object and the receiving device. The spatial location information of the second object includes a second angle of arrival of a wireless signal that is reflected by the second object and that is relative to the receiving device, and a second range between the second object and the receiving device.

With reference to the first aspect, in a possible design, the method further includes outputting one or more of the following information: whether the first object is the sneeze droplets, whether the second object is the sneezing action, the spatial location information of the first object, or the spatial location information of the second object. Optionally, a manner of outputting the information may be directly sending the information to a related mobile device, or may be uploading the information to a cloud, so that the cloud reminds cleaning personnel to perform cleaning based on information such as a quantity of sneezing persons and a range of sneeze droplets.

In this solution, various types of information are output, to remind related personnel of an occurrence area and an impact range of sneeze droplets. This avoids a potential infection risk.

With reference to the first aspect, in a possible design, after the obtaining a wireless signal, the method further includes obtaining an attenuation spectrum or a wideband spectrum of the wireless signal, and determining, based on the Doppler information of the wireless signal and the attenuation spectrum or wideband spectrum of the wireless signal, whether the first object is the sneeze droplets. The attenuation spectrum of the wireless signal may be used for indicating impact of the first object on amplitude attenuation of the wireless signal. The wideband spectrum of the wireless signal may be used for indicating impact of the first object on wideband spectrum energy of the wireless signal.

In this solution, both impact of the sneeze droplets on the Doppler information of the wireless signal and impact of the sneeze droplets on the attenuation spectrum/wideband spectrum of the wireless signal are considered, to comprehensively determine sneeze droplets. This can further improve accuracy.

With reference to the first aspect, in a possible design, determining, based on the Doppler information of the wireless signal, whether a first object is sneeze droplets further includes performing feature extraction on the Doppler information of the wireless signal, to obtain a first input feature, and inputting the first input feature to a classification model for processing, to output a classification result. The classification result is whether the first object is the sneeze droplets.

With reference to the first aspect, in a possible design, determining, based on the Doppler information of the wireless signal, whether a first object is sneeze droplets further includes directly inputting the Doppler information of the wireless signal to a classification model for processing, to output a classification result. The classification result is whether the first object is the sneeze droplets.

With reference to the first aspect, in a possible design, determining, based on the Doppler information of the wireless signal, whether a first object is sneeze droplets further includes dividing the Doppler information of the wireless signal into first Doppler information and second Doppler information, where a spread of the first Doppler information in Doppler frequency domain is less than a spread of the second Doppler information in Doppler frequency domain, inputting the first Doppler information to a first recognizer for recognition, to recognize whether the second object is the sneezing action, inputting the second Doppler information to a second recognizer for recognition, to recognize whether the second Doppler information includes a Doppler feature of the first object, and inputting information about whether the second object is the sneezing action and whether the second Doppler information includes the Doppler feature of the first object to a decider, to determine whether the first object is the sneeze droplets.

The solution provides a plurality of droplet detection methods. In actual application, different droplet detection methods may be selected according to different situations.

According to a second aspect, this disclosure provides an electronic device, including a first obtaining module configured to obtain a wireless signal, where the wireless signal propagates in space including a first object, a first processing module configured to perform Doppler estimation on the wireless signal, to obtain Doppler information of the wireless signal, where the Doppler information of the wireless signal is used for indicating impact of the first object on a frequency of the wireless signal, and a first determining module configured to determine, based on the Doppler information of the wireless signal, whether the first object is sneeze droplets.

With reference to the second aspect, in a possible design, the wireless signal may further propagate in space including a second object. The Doppler information of the wireless signal is further used for indicating impact of the second object on the frequency of the wireless signal. The impact of the first object on the frequency of the wireless signal is different from the impact of the second object on the frequency of the wireless signal. The electronic device further includes a second determining module. The second determining module is configured to determine, based on the Doppler information of the wireless signal, whether the second object is a sneezing action. The first determining module and the second determining module may be a same module, or may be different modules. The second object may be a body action of a person.

With reference to the second aspect, in a possible design, the electronic device may further include a second processing module. The second processing module is configured to perform angle-of-arrival estimation, range estimation, and Doppler estimation on the wireless signal, to obtain spatial location information of the first object and spatial location information of the second object. The spatial location information of the first object includes a first angle of arrival of a wireless signal that is reflected by the first object and that is relative to a receiving device, and a first range between the first object and the receiving device. The spatial location information of the second object includes a second angle of arrival of a wireless signal that is reflected by the second object and that is relative to the receiving device, and a second range between the second object and the receiving device.

With reference to the second aspect, in a possible design, the electronic device may further include an output module. The output module is configured to output one or more of the following information: whether the first object is the sneeze droplets, whether the second object is the sneezing action, the spatial location information of the first object, or the spatial location information of the second object.

With reference to the second aspect, in a possible design, the electronic device may further include a second obtaining module and a third determining module. The second obtaining module is configured to obtain an attenuation spectrum or a wideband spectrum of the wireless signal. The attenuation spectrum of the wireless signal is used for indicating impact of the first object on amplitude attenuation of the wireless signal. The wideband spectrum of the wireless signal is used for indicating impact of the first object on wideband spectrum energy of the wireless signal. The third determining module is configured to determine, based on the Doppler information of the wireless signal and the attenuation spectrum or wideband spectrum of the wireless signal, whether the first object is the sneeze droplets.

With reference to the second aspect, in a possible design, the first determining module is further configured to perform feature extraction on the Doppler information of the wireless signal, to obtain a first input feature, and input the first input feature to a classification model for processing, to output a classification result. The classification result is whether the first object is the sneeze droplets.

With reference to the second aspect, in a possible design, the first determining module is further configured to input the Doppler information of the wireless signal to a classification model for processing, to output a classification result. The classification result is whether the first object is the sneeze droplets.

With reference to the second aspect, in a possible design, the first determining module is further configured to divide the Doppler information of the wireless signal into first Doppler information and second Doppler information, where a spread of the first Doppler information in Doppler frequency domain is less than a spread of the second Doppler information in Doppler frequency domain, input the first Doppler information to a first recognizer for recognition, to recognize whether the second object is the sneezing action, input the second Doppler information to a second recognizer for recognition, to recognize whether the second Doppler information includes a Doppler feature of the first object, and input information about whether the second object is the sneezing action and whether the second Doppler information includes the Doppler feature of the first object to a decider, to determine whether the first object is the sneeze droplets.

According to a third aspect, this disclosure provides another electronic device, including a processor. The processor is configured to obtain a wireless signal, perform Doppler estimation on the wireless signal, to obtain Doppler information of the wireless signal, and determine, based on the Doppler information of the wireless signal, whether a first object is sneeze droplets. The wireless signal propagates in space including the first object. The Doppler information of the wireless signal may be used for indicating impact of the first object on a frequency of the wireless signal.

Optionally, the electronic device may further include a memory. The memory is configured to be coupled to the processor, and stores program instructions and data that are necessary for the electronic device.

According to a fourth aspect, this disclosure provides a computer-readable storage medium. The computer-readable storage medium stores instructions. The instructions may be executed by one or more processors on a processing circuit. When the instructions are run on a computer, the computer is enabled to perform the method for sensing sneezing based on a wireless signal according to any one of the foregoing aspects. Optionally, the computer-readable storage medium may be a non-volatile readable storage medium.

According to a fifth aspect, this disclosure provides a computer program product including instructions. When the computer program product runs on a computer, the computer is enabled to perform the method for sensing sneezing based on a wireless signal according to any one of the foregoing aspects.

According to a sixth aspect, this disclosure provides a chip or a chip system, including a processing circuit. The processing circuit may be configured to perform the following operations of obtaining a wireless signal, performing Doppler estimation on the wireless signal, to obtain Doppler information of the wireless signal, and determining, based on the Doppler information of the wireless signal, whether a first object is sneeze droplets. The wireless signal propagates in space including the first object. The Doppler information of the wireless signal may be used for indicating impact of the first object on a frequency of the wireless signal.

Optionally, the chip or the chip system may further include an input/output interface. The input/output interface may be configured to output one or more of the following information: whether the first object is the sneeze droplets, whether a second object is a sneezing action, spatial location information of the first object, or spatial location information of the second object.

According to embodiments of this disclosure, existing WLAN devices may be used for performing signal processing on a wireless signal, to detect sneeze droplets from sneezing without being affected by light and noise in an environment.

BRIEF DESCRIPTION OF DRAWINGS

To describe the technical solutions in some embodiments of this disclosure more clearly, the following briefly describes the accompanying drawings used for describing embodiments.

DESCRIPTION OF EMBODIMENTS

The following clearly and completely describes the technical solutions in embodiments of this disclosure with reference to the accompanying drawings in embodiments of this disclosure.

To facilitate understanding of the technical solutions in embodiments of this disclosure, the following describes a system architecture and/or an application scenario of a method for sensing sneezing based on a wireless signal according to an embodiment of this disclosure. It may be understood that scenarios described in embodiments of this disclosure are intended to describe the technical solutions in embodiments of this disclosure more clearly, and do not constitute a limitation on the technical solutions provided in embodiments of this disclosure.

An embodiment of this disclosure provides a method for sensing sneezing based on a wireless signal. Existing WLAN devices may be used for performing signal processing on a radio frequency signal (or a wireless signal) without an additional device such as a microphone or a camera, to locate and recognize sneezing and detect droplets without being affected by light and noise in an environment. The method may be applied to a wireless communication system, and the wireless communication system may be a WLAN or a cellular network. The method may be implemented by a communication device, or a chip or a processor in the communication device in the wireless communication system. The communication device may be an AP device or a STA device. The access point device and the station device each may be a single-link device or a multi-link device.

Figure 1:
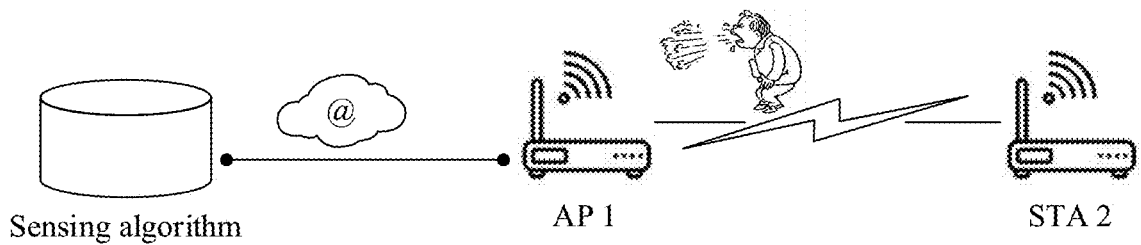
FIG. 1 is a diagram of a system architecture according to an embodiment of this disclosure.

FIG. 1 is a diagram of a system architecture according to an embodiment of this disclosure. As shown in FIG. 1, the system architecture includes at least two WLAN devices (for example, an AP 1 and a STA 2 in FIG. 1). One WLAN device (for example, the STA 2) sends an RF signal, and another WLAN device (for example, the AP 1) receives the RF signal. Optionally, as shown in FIG. 1, the system architecture may further include a cloud computing center. The WLAN device may support a WLAN communication protocol. The communication protocol may include the Institute of Electrical and Electronics Engineers (IEEE) 802.11be (or referred to as WI-FI 7, Extremely High Throughput (EHT) protocol), and may further include protocols such as IEEE 802.11ax and IEEE 802.11ac. Certainly, the communication protocol may further include a next-generation protocol of IEEE 802.11be and the like with continuous evolution and development of communication technologies.

In this disclosure, an apparatus for implementing the method in this disclosure may be an AP or a STA in a WLAN, or may be a chip or a processing system installed in the AP or the STA, or may be a cloud computing center. The WLAN device may send and receive a WI-FI signal to locate and recognize sneezing and detect sneeze droplets. Related calculation may be performed on a WLAN AP, or may be uploaded to the cloud computing center for processing by using a powerful cloud computing capability. It may be understood that cloud processing has a powerful computing capability and greater flexibility compared with AP side processing. In this way, corresponding sensing algorithms may be adapted for different situations, to optimize sensing performance.

It may be understood that the "radio frequency signal", "WLAN signal", "WI-FI signal", and "wireless signal" in this disclosure are used interchangeably, and all refer to signals transmitted in a wireless manner.

An access point (for example, the AP 1) is an apparatus having a wireless communication function, supports communication by using a WLAN protocol, has a function of communicating with another device (for example, a station or another access point) in a WLAN network, and certainly, may further have a function of communicating with another device. In a WLAN system, an access point may be referred to as an AP STA. The apparatus having the wireless communication function may be an entire device, or may be a chip or a processing system installed in the entire device. The device in which the chip or the processing system is installed may implement the method and the function in embodiments of this disclosure under control of the chip or the processing system. The AP in embodiments of this disclosure is an apparatus providing a service for a STA, and may support 802.11 series protocols. For example, the AP may be a communication entity, for example, a communication server, a router, a switch, or a bridge. The AP may include a macro base station, a micro base station, a relay station, and the like in various forms. Certainly, the AP may alternatively be a chip or a processing system in any one of these devices in various forms, to implement the method and function in embodiments of this disclosure.

A station (for example, the STA 2) is an apparatus having a wireless communication function, supports communication by using a WLAN protocol, and has a capability of communicating with another station or access point in a WLAN network. In the WLAN system, a station may be referred to as a non-access point station (non-access point station, non-AP STA). For example, the STA is any user communication device that allows a user to communicate with an AP and further communicate with a WLAN. The apparatus may be an entire device, or may be a chip or a processing system installed in the entire device. The device in which the chip or the processing system is installed may implement the method and the function in embodiments of this disclosure under control of the chip or the processing system. For example, the STA may be a user device that can connect to the internet, for example, a tablet computer, a desktop computer, a laptop computer, a notebook computer, an ultra-mobile personal computer (UMPC), a handheld computer, a netbook, a personal digital assistant (PDA), or a mobile phone. Alternatively, the STA may be an internet of things node in the internet of things, an in-vehicle communication apparatus in the internet of vehicles, an entertainment device, a game device or system, a global positioning system device, or the like. The STA may alternatively be a chip or a processing system in any one of the foregoing terminals.

Figure 2:
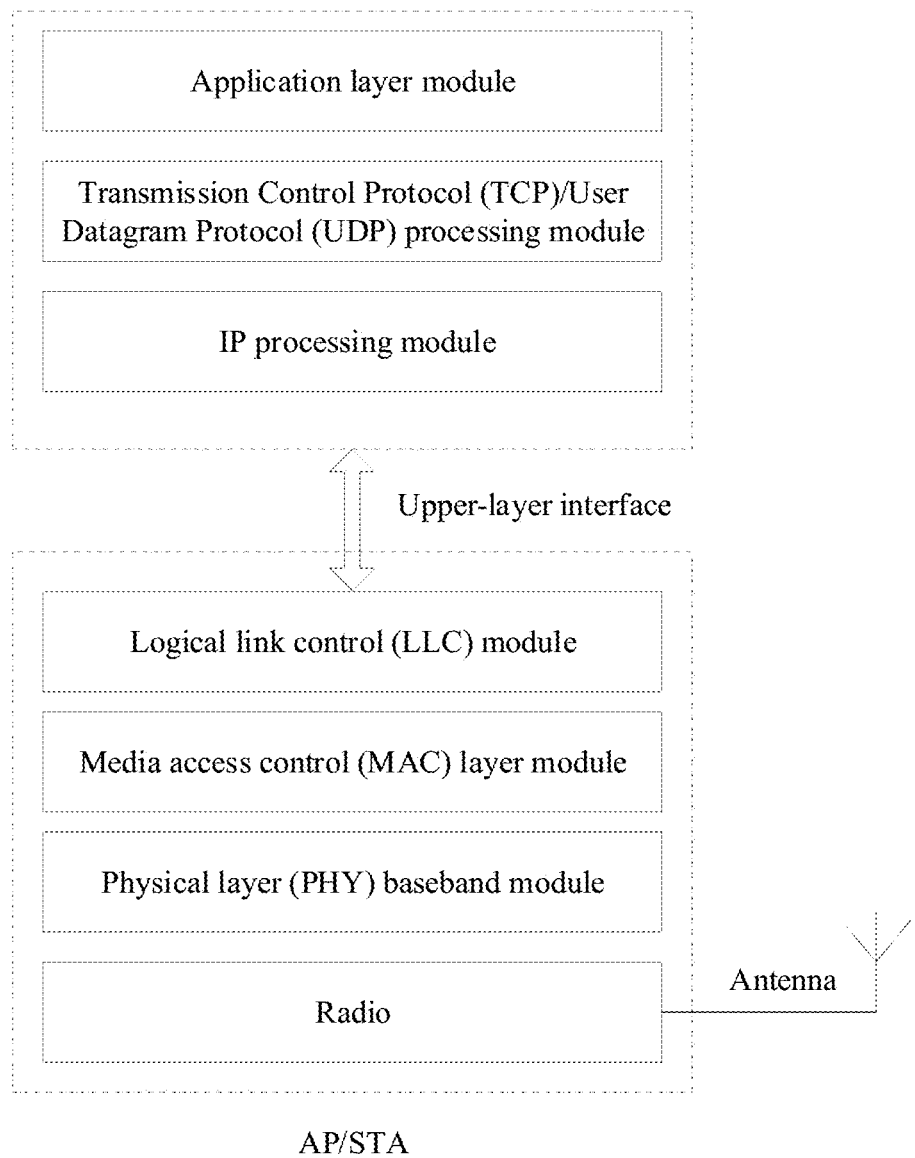
FIG. 2 is a schematic diagram of a structure of an access point (AP) or a station (STA) according to an embodiment of this disclosure.

Further, this disclosure focuses on a method for sensing sneezing based on a wireless signal/WI-FI signal. Structures of the AP and the STA are briefly described below. FIG. 2 is a schematic diagram of a structure of an AP or a STA according to an embodiment of this disclosure. As shown in FIG. 2, the AP or the STA may include an application layer module, a Transmission Control Protocol (TCP)/User Datagram Protocol (UDP) processing module, an Internet Protocol (IP) processing module, a logical link control (LLC) module, a media access control (MAC) layer module, a physical (PHY) layer baseband module, a radio, an antenna, and the like. The AP or the STA shown in FIG. 2 may be of a single-antenna structure, or may be of a multi-antenna structure. This is not limited in embodiments of this disclosure.

The WLAN system can provide high-speed and low-latency transmission. With continuous evolution of WLAN application scenarios, the WLAN system is to be applied to more scenarios or industries, for example, the internet of things industry, the internet of vehicles industry, the banking industry, enterprise offices, exhibition halls of stadiums, concert halls, hotel rooms, dormitories, wards, classrooms, supermarkets, squares, streets, production workshops and warehousing. Certainly, a device (such as an access point or a station) that supports WLAN communication may be a sensor node (for example, a smart water meter, a smart electricity meter, or a smart air detection node) in a smart city, a smart device (for example, a smart camera, a projector, a display, a television, a stereo, a refrigerator, or a washing machine) in a smart home, a node in the internet of things, an entertainment terminal (for example, an AR, a virtual reality (VR), or another wearable device), a smart device in smart office (for example, a printer, a projector, a loudspeaker, or a stereo), an internet of vehicle device in the internet of vehicle, an infrastructure (for example, a vending machine, a self-service navigation station of a supermarket, a self-service cash register device, or a self-service ordering machine) in daily life scenarios, a device in a large sports or music venue, and the like. Specific forms of the STA and the AP are not limited in embodiments of this disclosure, and are merely examples for description herein.

The foregoing content briefly describes the system architecture provided in embodiments of this disclosure. With reference to possible application scenarios provided in embodiments of this disclosure and more accompanying drawings, the following describes in detail a method for sensing sneezing based on a wireless signal provided in embodiments of this disclosure.

Embodiment 1

Embodiment 1 of this disclosure describes, with reference to a possible application scenario, a method for sensing sneezing based on a wireless signal provided in this disclosure. In an application scenario in this embodiment of this disclosure, two devices are used as an example. One device is a sending device, and the other device is a receiving device. It may be understood that the "sending device" in this disclosure refers to a WLAN device that sends a wireless signal, and the "receiving device" refers to a WLAN device that receives the wireless signal. It may be further understood that the sending device in this disclosure can send a signal and can also receive a signal. Because the sending device has a main function of sending a wireless signal in this disclosure, the device is referred to as a sending device. The receiving device in this disclosure can receive a signal and can send a signal. Because the receiving device has a main function of receiving a wireless signal in this disclosure, the device is referred to as a receiving device.

Figure 3:
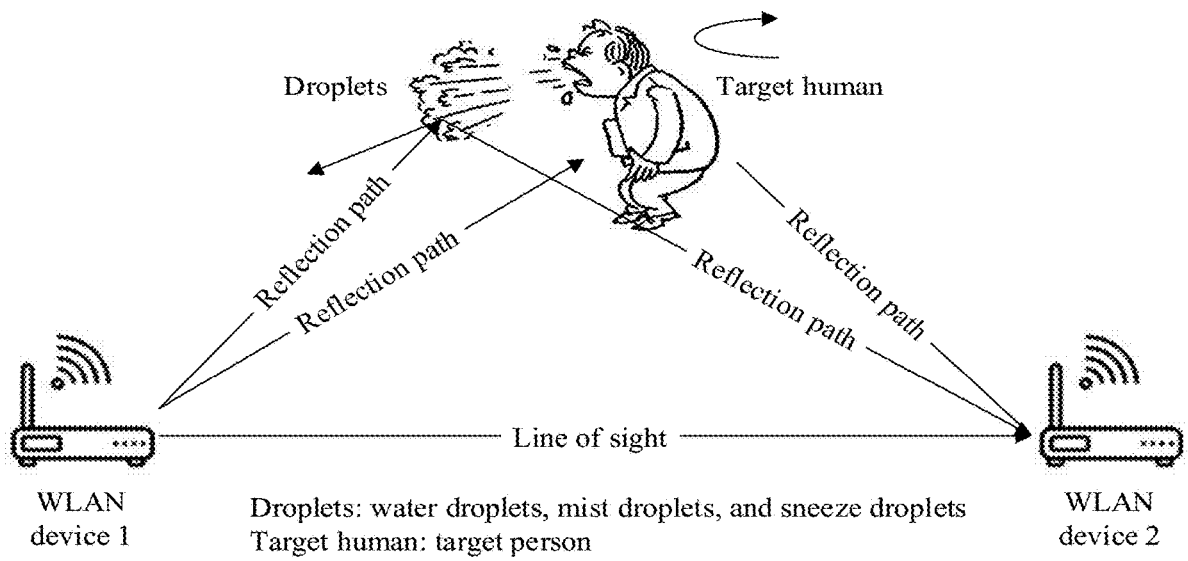
FIG. 3 is a schematic diagram of an application scenario according to an embodiment of this disclosure.

Further, FIG. 3 is a schematic diagram of an application scenario according to an embodiment of this disclosure. As shown in FIG. 3, there are at least two WLAN devices in space: a WLAN device 1 and a WLAN device 2. In addition, a target person (for example, a target human in FIG. 3) is sneezing in the space, and sneeze droplets are generated from sneezing. The WLAN device 1 sends a wireless signal. The wireless signal may arrive at the WLAN device 2 through a line of sight/direct path, or after being reflected by the target human, or after being reflected by the sneeze droplets. The wireless signal received by the WLAN device 2 is superimposition of a plurality of paths of signals (including signals on the line of sight and two reflection paths in FIG. 3, and other multipath signals not shown in FIG. 3). The WLAN device 2 may perform a plurality of types of signal processing on the received wireless signal. A sneezing action of a target object (for example, the target person in FIG. 3) and sneeze droplets generated from sneezing are located and recognized based on impact of the sneezing action of the target object on the wireless signal (for example, impact on a frequency of the wireless signal) and impact of the sneeze droplets on the wireless signal (for example, impact on the frequency, amplitude attenuation, or wideband spectrum energy of the wireless signal). In this way, sneezing is located and recognized and sneeze droplets are detected without being affected by light and noise in an environment.

Optionally, the WLAN device 2 may alternatively transmit the received wireless signal to a cloud computing center for processing, and the cloud computing center performs signal processing and the like on the wireless signal.

It may be understood that the WLAN device 1 and the WLAN device 2 may be both APs or STAs. Alternatively, one WLAN device may be an AP, and the other WLAN device may be a STA. For example, the WLAN device 1 is a STA, and the WLAN device 2 is an AP.

Figure 4:
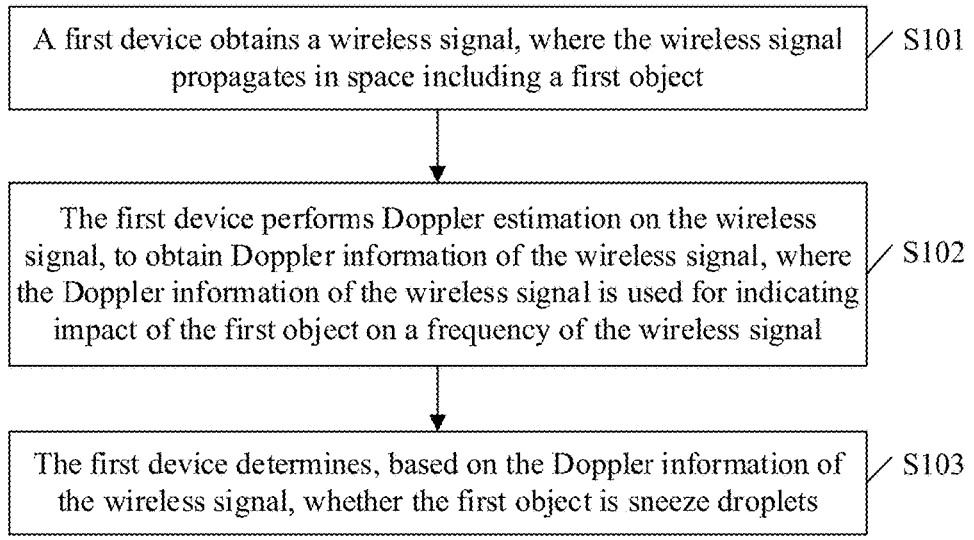
FIG. 4 is a schematic flowchart of a method for sensing sneezing based on a wireless signal according to an embodiment of this disclosure.

According to the application scenario shown in FIG. 3, an embodiment of this disclosure provides a method for sensing sneezing based on a wireless signal. FIG. 4 is a schematic flowchart of a method for sensing sneezing based on a wireless signal according to an embodiment of this disclosure. As shown in FIG. 4, the method for sensing sneezing based on a wireless signal includes but is not limited to the following steps.

S101: A first device obtains a wireless signal, where the wireless signal propagates in space including a first object.

Further, when the first device is a receiving device, the first device receives/collects a wireless signal, and performs preprocessing, for example, filtering processing, on the received/collected wireless signal. When the first device is a cloud computing center, a receiving device receives/collects a wireless signal, and may send the received/collected wireless signal to the cloud computing center. The cloud computing center performs a subsequent signal processing process/step. It may be understood that the cloud computing center has a powerful computing capability and greater flexibility. In this way, corresponding sensing algorithms may be adapted for different situations, to optimize sensing performance. However, large bandwidth is required to support data transmission due to a large data amount of the wireless signal received/collected by the receiving device.

The wireless signal received/collected by the receiving device may be superimposition of multipath/multipath signals, and at least one path of signal in the wireless signal is obtained after being reflected by the first object. It may be understood that after the sending device sends an original wireless signal, the original wireless signal propagates in the space including the first object. Therefore, the original wireless signal arrives at the receiving device after being reflected by at least the first object. Optionally, the original wireless signal may alternatively arrive at the receiving device through a direct path. The first object may be droplets, small water droplets in the space, or the like.

It may be understood that, in a subsequent step, other signal processing may be performed on a preprocessed wireless signal. For example, Doppler estimation may be performed on the preprocessed wireless signal in step S102.

S102: The first device performs Doppler estimation on the wireless signal, to obtain Doppler information of the wireless signal, where the Doppler information of the wireless signal is used for indicating impact of the first object on a frequency of the wireless signal.

Further, the Doppler information of the wireless signal may be used for indicating the impact of the first object on the frequency of the wireless signal. The Doppler information of the wireless signal may include a time-Doppler spectrum, a range-Doppler-time spectrum, or Doppler information in another dimension. The first device may perform Doppler estimation on the wireless signal, to obtain the time-Doppler spectrum of the wireless signal. Alternatively, the first device may perform signal processing such as angle-of-arrival estimation, range estimation, Doppler estimation, or multi-dimensional joint processing on the wireless signal, to obtain the range-Doppler-time spectrum or the Doppler information in another dimension of the wireless signal. It may be understood that, if an original wireless signal sent by the sending device propagates in space including a plurality of objects, Doppler information of the wireless signal may separately indicate impact of the plurality of objects on a frequency of the wireless signal. In other words, motion features of the plurality of objects may be indicated on one Doppler spectrum.

Droplets are used as an example. As the droplets move in space, the moving droplets may generate Doppler modulation on a signal propagated in the space. In this case, corresponding analysis, such as time-frequency analysis, is performed on a received/collected wireless signal. Time-varying Doppler features may be found in a time-Doppler dimension, and the features can indicate real motion of the droplets. Therefore, the droplets can be recognized based on Doppler information. Similarly, the moving droplets have unique features in the time-Doppler dimension. In addition, droplet motion may generate, in another dimension, corresponding information having a corresponding droplet motion feature. For example, time-varying range information may be indicated in a time-range dimension, and the information may also assist in subsequent sneeze droplet recognition. There is also time-angle information, or information in other joint dimensions, and the information may also assist in subsequent sneeze droplet recognition.

Angle-of-arrival estimation may be performed by using a beamforming algorithm, a subspace method, or another array signal processing method. Range estimation may be performed by using a signal processing algorithm such as matched filtering. Doppler estimation may be performed by using a signal processing algorithm such as Fourier transform. Principles of angle-of-arrival estimation, range estimation, and Doppler estimation are separately described below.

Figure 5:
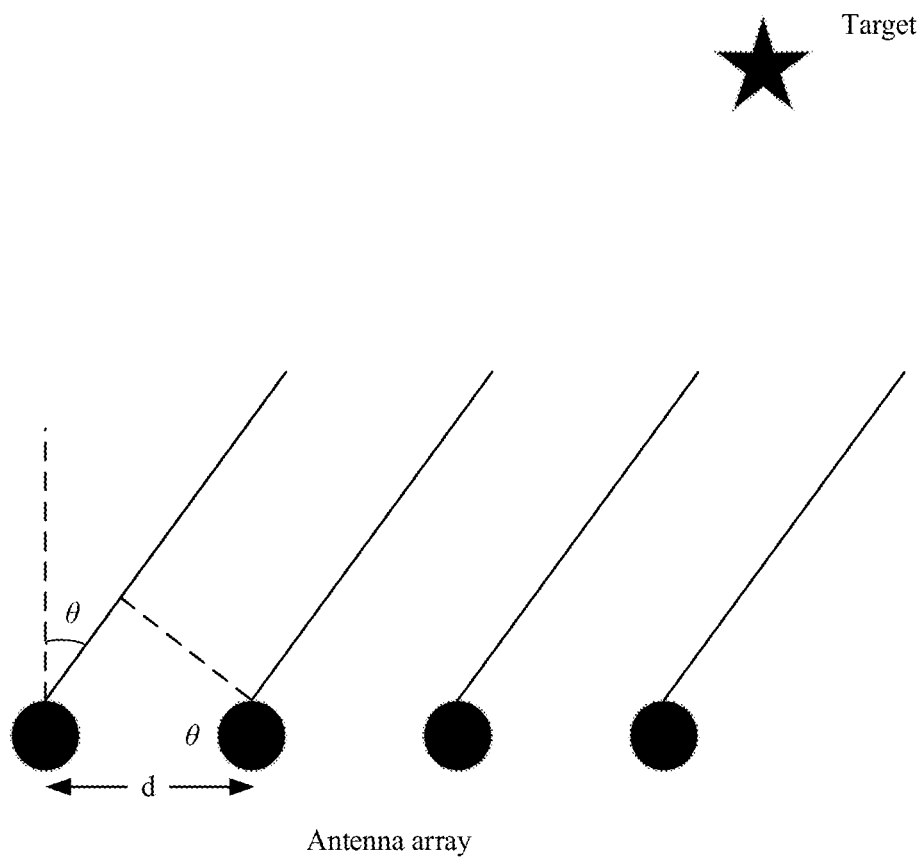
FIG. 5 is a schematic diagram of angle-of-arrival estimation according to an embodiment of this disclosure.

(1) Angle-of-Arrival Estimation:

FIG. 5 is a schematic diagram of angle-of-arrival estimation according to an embodiment of this disclosure. As shown in FIG. 5, it is assumed that an array antenna located in a far field is, for example, a one-dimensional uniform linear array of four array elements, and a spacing between the array elements is d. When a receiving array is in a far field of a signal (that is, when the signal arrives at the antenna array in a plane wave form), a wave path difference between plane waves arriving at different array elements is $d \sin \theta$, and a corresponding phase difference is generated between corresponding signals received by receiving array elements. The following uses a beamforming algorithm and a subspace method as examples for brief description. It may be understood that the "received signal" in this disclosure refers to a wireless signal received by a receiving device.

Beamforming: An antenna is used for forming a beam, to scan space. When energy in a direction is stronger, it may be determined that a signal exists in the direction. A beam width (namely, a beam resolution) formed by using this method is restricted by an aperture of an antenna array. A larger aperture indicates a higher resolution.

The subspace method is briefly described herein by using a multiple signal classification method (MUSIC) as an example.

$$x = As + n \quad (1\text{-}1)$$

In the formula (1-1), x indicates a signal received by a receiving array, s indicates a source signal, namely, a signal sent by a transmit end, A indicates a steering vector matrix, and n indicates noise.

A covariance matrix of the received signal is first obtained (usually by using a plurality of snapshots):

$$\hat{R}_{xx} = xx^H/L \quad (1\text{-}2)$$

In the formula (1-2), L indicates a quantity of snapshots for joint processing, and $\hat{R}_{xx}$ indicates a covariance matrix obtained through estimation based on the L snapshots.

The covariance matrix $\hat{R}_{xx}$ is divided into a signal subspace and a noise subspace by performing eigen decomposition on the covariance matrix:

$$\hat{R}_{xx} = U_s \Sigma_s U_s^H + U_n \Sigma_n U_n^H \quad (1\text{-}3)$$

In the formula (1-3), $U_s \Sigma_s U_s^H$ indicates the signal subspace, and $U_n \Sigma_n U_n^H$ indicates the noise subspace.

Related derivation may prove that:

$$A^H U_n = 0 \quad (1\text{-}4)$$

To be specific, a steering vector of the received signal is orthogonal to the noise subspace obtained through decomposition. According to this conclusion, the following formula (1-5) can be used for spectrum peak search and angle-of-arrival estimation.

$$P_{MUSIC}(\theta) = \frac{1}{a^H(\theta) U_n U_n^H a(\theta)} \quad (1\text{-}5)$$

In the formula (1-5), a indicates a steering vector (steering vector) of the receiving array.

$$A = [a(\theta_1), a(\theta_2), \ldots, a(\theta_K)] \in C^{M \times K} \quad (1\text{-}6)$$

$$a(\theta_k) = [1, e^{-j2\pi d \sin \theta_k / \lambda}, \ldots, e^{-j2\pi (M-1) d \sin \theta_k / \lambda}]^T \quad (1\text{-}7)$$

In the formula (1-6) and formula (1-7), C indicates a complex number set, M indicates a quantity of array elements in the receiving array, K indicates a quantity of beam directions, d indicates an array element spacing, θ indicates an incident angle of a signal, and λ indicates a wavelength.

Optionally, the subspace method further includes a method, for example, estimation of signal parameters via rotational invariance techniques (ESPRIT). In addition to the subspace method, a sparse method may alternatively be used for angle-of-arrival estimation.

Figure 6:
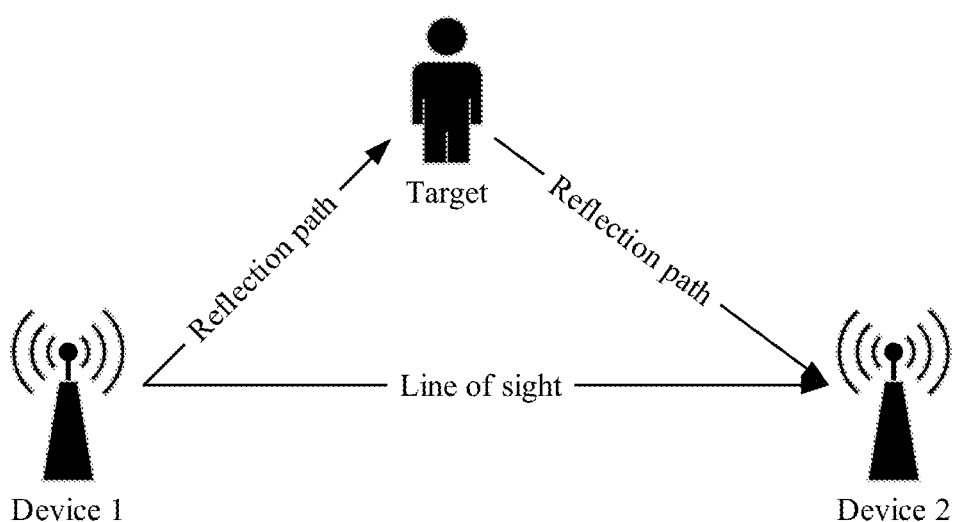
FIG. 6 is a schematic diagram of range estimation according to an embodiment of this disclosure.

(2) Range Estimation:

FIG. 6 is a schematic diagram of range estimation according to an embodiment of this disclosure. As shown in FIG. 6, a device 1, a target object, and a device 2 form a typical WLAN sensing scenario. The device 1 sends a wireless signal, and the wireless signal is reflected by the target object and then received by the device 2. In addition, the device 2 may also receive a line of sight signal directly sent by the device 1. Therefore, when the device 1 sends a wireless signal, a signal received by the device 2 is superimposition of a line of sight signal and a reflection path signal (in FIG. 6, one reflection path is used as an example for ease of description). The wireless signal sent by the device 1 has a good autocorrelation characteristic (to be specific, when two signals are completely time-aligned, autocorrelation energy is maximum, and when there is a delay between the two signals, the autocorrelation energy is very small). In this case, the device 2 performs time domain matched filtering processing (namely, autocorrelation) on a reference signal and the received signal, so that two peaks may be obtained on a time-energy spectrum. A first peak indicates the line of sight signal, and a second peak indicates the reflection path signal. A time difference between the two peaks may indicate a propagation delay difference between signals of the reflection path and the line of sight, and correspond to a propagation range difference in a real environment.

Therefore, the propagation range difference between signals of the reflection path and the line of sight and location information of the device 1 and the device 2 (namely, a sending device and a receiving device) are obtained. It may be deduced that the target object is on an ellipse that uses the sending device and the receiving device as focuses and on which a sum of ranges between the target object and the device 1 and between the target object and the device 2 is a sum of a range of the line of sight and the propagation range difference that is obtained through calculation. The target object may be located based on angle information of an angle of arrival obtained above.

It may be understood that matched filtering may be processed in time domain or in frequency domain. Matched filtering is a processing method in a radar, and this method may also be applied to channel estimation in communication. It may be further understood that, in addition to range estimation based on matched filtering, range estimation may alternatively be performed in another signal processing manner. This is not described herein again.

It may be understood that a range in the range-Doppler-time spectrum may be a propagation range difference between a reflection path and a line of sight.

(3) Doppler Estimation:

Doppler estimation may be directly processed by using Fourier transform. Further, a part of a time domain signal may be transformed into a part of a frequency domain signal by using Fourier transform. Spectrum energy is analyzed, to estimate a Doppler component. Generally, longer duration of the time domain signal indicates a higher resolution in the frequency domain according to an uncertainty principle.

$$\Delta f = \frac{1}{T} \quad (1\text{-}8)$$

T indicates duration of the time domain signal, and $\Delta f$ indicates a frequency spacing.

S103: The first device determines, based on the Doppler information of the wireless signal, whether the first object is sneeze droplets.

Further, if the Doppler information of the wireless signal is a time-Doppler spectrum, because the time-Doppler spectrum is a two-dimensional feature, the time-Doppler spectrum may be used as an image and is directly input to an image-specific neural network for training and recognition. To be specific, the first device may directly input the Doppler information of the wireless signal to a classification model for processing, to obtain a classification result output by the classification model. The classification result may be whether the first object is sneeze droplets. It may be understood that, in addition to the time-Doppler spectrum, the wireless signal may alternatively be analyzed in another dimension. For example, three-dimensional information of a range-Doppler-time spectrum is used as information that is further input to the classification model. The classification model may be a convolutional neural network model. It is assumed that an input layer of the convolutional neural network is two-dimensional information (namely, a picture or a two-dimensional matrix). The first device may extend the Doppler information of the wireless signal to a two-dimensional matrix, and input the matrix to the neural network. Feature extraction is performed by using a subsequent convolutional layer, and then classification is performed by using a classification layer. Finally, whether the first object is the sneeze droplets is determined.

Optionally, the first device may perform feature extraction on the Doppler information of the wireless signal, to obtain a first input feature, and then may input the first input feature to the classification model for processing, to obtain a classification result output by the classification model. The classification result may be whether the first object is the sneeze droplets. The classification model may be a deep neural network or another classifier.

Figure 7:
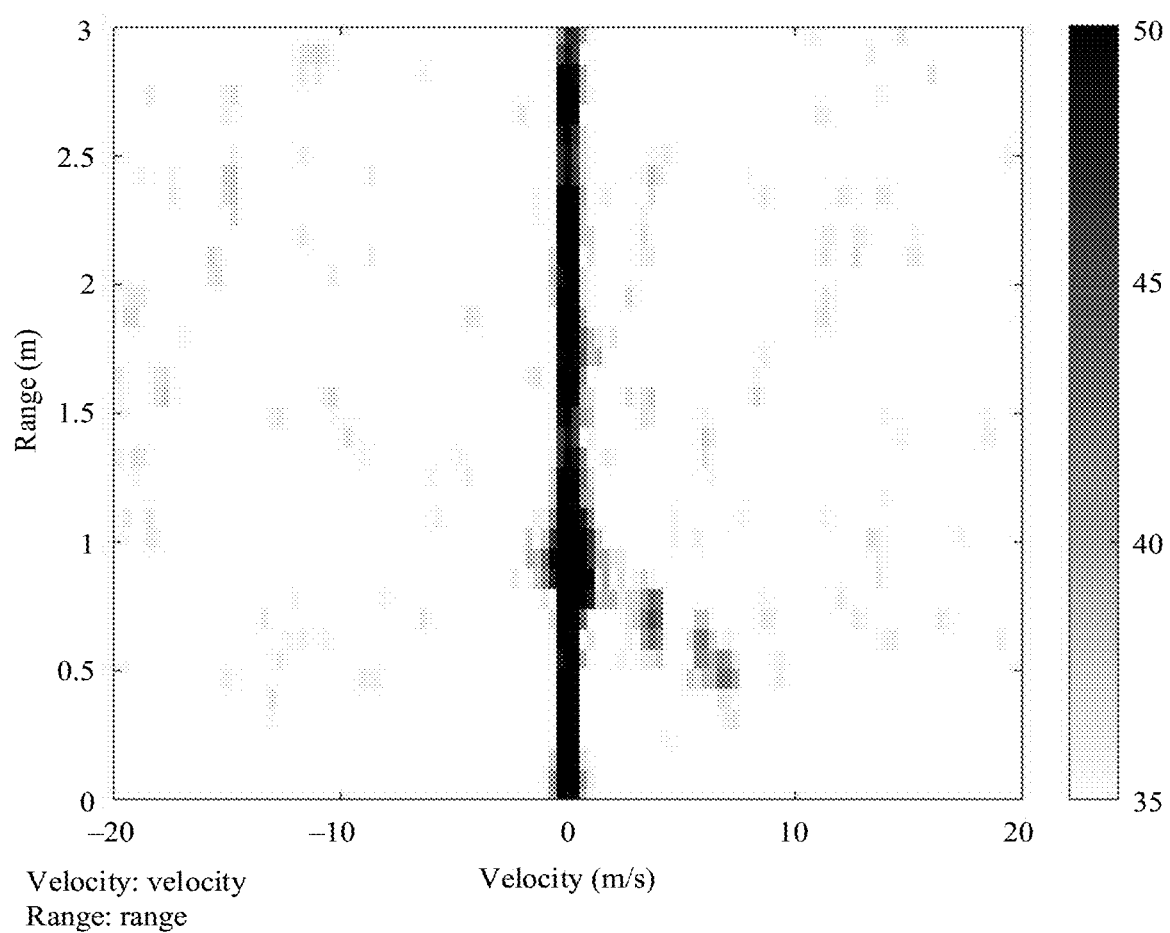
FIG. 7 is a schematic diagram of a range-Doppler spectrum of sneeze droplets according to an embodiment of this disclosure.

Optionally, FIG. 7 is a schematic diagram of a range-Doppler spectrum of sneeze droplets according to an embodiment of this disclosure. Because there is a correspondence between a velocity and a Doppler component, the velocity may be used for indicating Doppler information. As shown in FIG. 7, a horizontal axis represents the velocity (meters per second (m/s)), and a vertical axis represents a range (meters (m)). A rightmost rectangular bar (gray-level bar) in FIG. 7 indicates a magnitude in an energy dimension, and different gray levels indicate different magnitudes of energy. Sneeze droplets usually have a high velocity (a Doppler feature of the sneeze droplets generally appears at a high Doppler location), and have a large spread in Doppler frequency domain. Therefore, the first device may extract Doppler information corresponding to the first object from the Doppler information of the wireless signal, and may input the extracted Doppler information corresponding to the first object to a recognizer of a two-dimensional neural network for recognition. The first device may obtain a recognition result output by the recognizer, that is, whether the Doppler information corresponding to the first object includes a Doppler feature of the sneeze droplets, and may input the recognition result to a decider, to determine whether the first object is the sneeze droplets. It may be understood that, if the Doppler information corresponding to the first object includes the Doppler feature of the sneeze droplets, it indicates that the first object is the sneeze droplets. On the contrary, if the Doppler information corresponding to the first object does not include the Doppler feature of the sneeze droplets, it indicates that the first object is not the sneeze droplets.

Optionally, the first device may input the entire Doppler information of the wireless signal to a recognizer of a two-dimensional neural network for recognition, and does not need to extract a part of the Doppler information. The first device may obtain a recognition result output by the recognizer, that is, whether the Doppler information of the wireless signal includes a Doppler feature of the sneeze droplets, and may input the recognition result to a decider, to determine whether the first object is the sneeze droplets.

Optionally, the first device may perform template matching on the Doppler information of the wireless signal, to determine whether the first object is the sneeze droplets. For example, the first device may match the Doppler information of the wireless signal with Doppler information of the sneeze droplets. If a matching degree/similarity between the Doppler information of the wireless signal and the Doppler information of the sneeze droplets is greater than a threshold, it may be determined that the first object is the sneeze droplets.

Understandably, if the first object is the sneeze droplets, it indicates that sneezing exists in the space. In this embodiment of this disclosure, sneeze droplets are recognized by using special impact of the sneeze droplets on Doppler information of a wireless signal, to recognize whether sneezing exists. This recognition process may not be affected by light, noise, and an obstruction in an environment. This improves applicability of droplet detection.

In an optional embodiment, the receiving device may receive/collect a wireless signal, and perform preprocessing, for example, filtering processing, on the received/collected wireless signal, and may perform Doppler estimation on a preprocessed wireless signal, to obtain Doppler information of the wireless signal. The receiving device sends the Doppler information of the wireless signal to a cloud computing center. The cloud computing center determines, based on the Doppler information of the wireless signal, whether the first object is the sneeze droplets. In this embodiment of this disclosure, the Doppler information of the wireless signal is sent to the cloud computing center for processing, to use a powerful computing capability of the cloud computing center, and reduce computing complexity of the receiving device.

In another optional embodiment, when a person performs a corresponding action, a moving body generates Doppler modulation on a signal in space. In this case, corresponding analysis, such as time-frequency analysis, is performed on a received/collected wireless signal. Time-varying Doppler features may be found in a time-Doppler dimension, and the features correspond to a real body motion and can be used for further action recognition. Therefore, the method for sensing sneezing based on a wireless signal provided in this embodiment of this disclosure may be used for sensing not only sneezing but also coughing. Further, the first device may obtain a wireless signal. The wireless signal propagates in space including a third object, and the third object may be a coughing action. The first device may perform signal processing such as angle-of-arrival estimation, range estimation, Doppler estimation, or multi-dimensional joint processing on the wireless signal, to obtain Doppler information of the wireless signal. The Doppler information of the wireless signal may be used for indicating impact of the third object on a frequency of the wireless signal. The first device may determine, based on the Doppler information of the wireless signal, whether the third object is a coughing action.

Embodiment 2

In Embodiment 2 of this disclosure, sneeze droplets and a sneezing action are jointly recognized, to reduce a misjudgment. In addition, both impact of the sneeze droplets on Doppler information of a wireless signal and impact of the sneeze droplets on an attenuation spectrum/wideband spectrum of the wireless signal are considered, to comprehensively determine sneeze droplets. This further improves accuracy. In addition, when the Doppler information of the wireless signal cannot be obtained, the sneeze droplets may be recognized based on the attenuation spectrum/wideband spectrum of the wireless signal. This implements sneeze droplet recognition/sneezing sensing in an extreme case.

Figure 8:
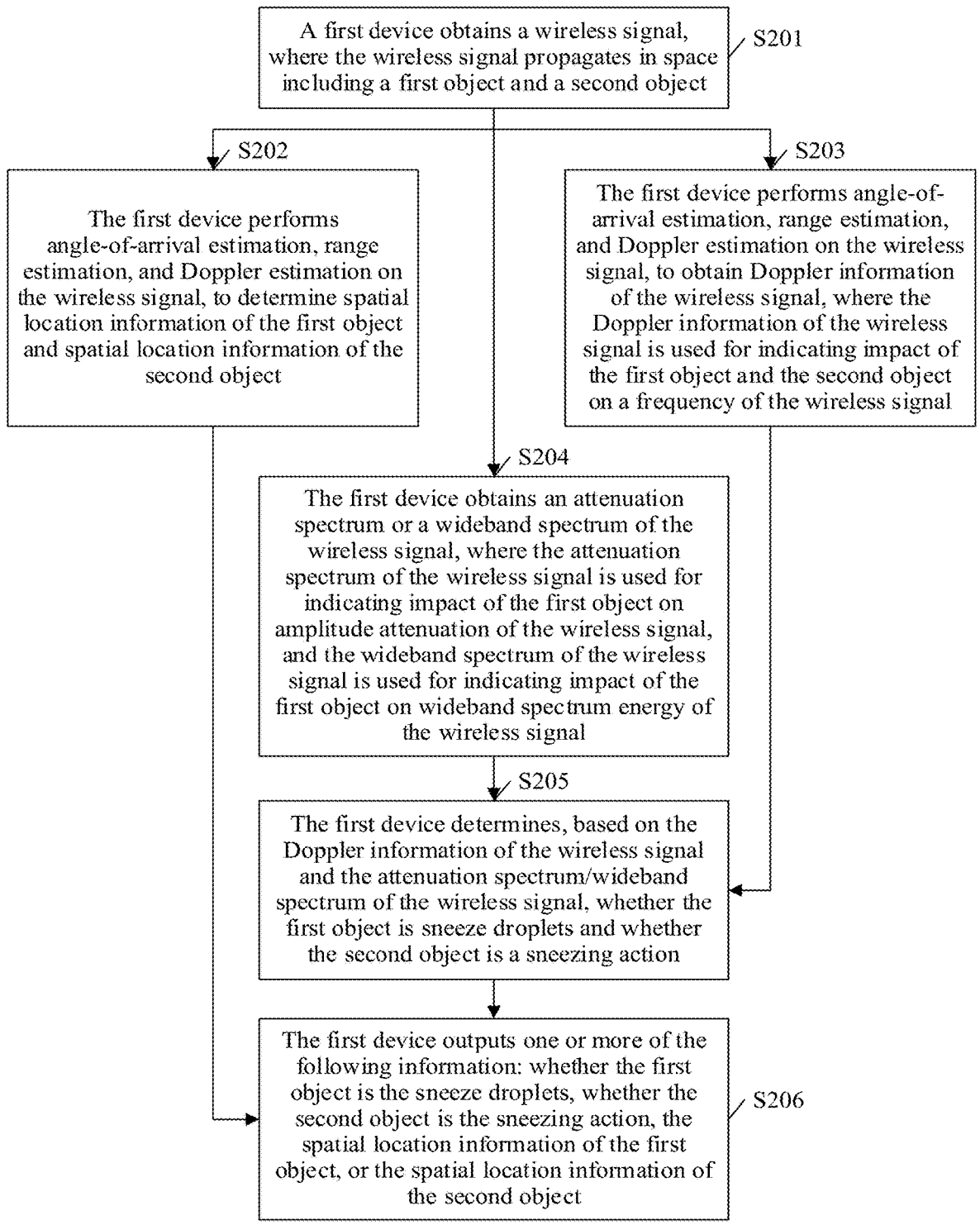
FIG. 8 is another schematic flowchart of a method for sensing sneezing based on a wireless signal according to an embodiment of this disclosure.

FIG. 8 is another schematic flowchart of a method for sensing sneezing based on a wireless signal according to an embodiment of this disclosure. As shown in FIG. 8, the method for sensing sneezing based on a wireless signal includes but is not limited to the following steps.

S201: A first device obtains a wireless signal, where the wireless signal propagates in space including a first object and a second object.

The first object may be droplets, small water droplets, or the like in the space. The second object may be a body action of a person.

Further, for an implementation of step S201 in this embodiment of this disclosure, refer to an implementation of step S101 in the embodiment shown in FIG. 4. Details are not described herein again.

Optionally, after obtaining the wireless signal, the first device may perform signal preprocessing, for example, filtering, on the wireless signal. Three types of processing, for example, the following step S202, step S203, and step S204, may be performed on a preprocessed wireless signal. It may be understood that the wireless signal in the following step S202, step S203, and step S204 may be a preprocessed wireless signal.

S202: The first device performs angle-of-arrival estimation, range estimation, and Doppler estimation on the wireless signal, to determine spatial location information of the first object and spatial location information of the second object.

Further, the first device performs, on the wireless signal, signal processing such as angle-of-arrival estimation (for example, a beamforming algorithm, a subspace method, or another array signal processing method), range estimation (for example, a signal processing algorithm such as matched filtering), and Doppler estimation (for example, a signal processing algorithm such as Fourier transform), and locates sneezing (namely, the second object) and droplets (namely, the first object) in a related signal dimension and region, in other words, determines the spatial location information of the first object and the spatial location information of the second object. For angle-of-arrival estimation, range estimation, and Doppler estimation, refer to the corresponding descriptions in Embodiment 1. Details are not described herein again. The spatial location information of the first object may include a first angle of arrival of a wireless signal that is reflected by the first object and that is relative to a receiving device, and a first range between the first object and the receiving device. The spatial location information of the second object may include a second angle of arrival of a wireless signal that is reflected by the second object and that is relative to the receiving device, and a second range between the second object and the receiving device.

It may be understood that locating of moving targets (for example, the first object and the second object) generally requires Doppler for detection. As shown in FIG. 7, the sneezing action usually has a low velocity (a Doppler feature of the sneezing action generally appears at a low Doppler location), and has a small spread in Doppler frequency domain. The sneeze droplets usually have a high velocity (a Doppler feature of the sneeze droplets generally appears at a high Doppler location), and have a large spread in Doppler frequency domain. It may be determined, based on such features, whether a detected target is the sneezing action or the sneeze droplets.

It may be further understood that a location of the sneezing action (namely, a spatial coordinate or range) slightly differs from a start location of the sneeze droplets (namely, a spatial coordinate or range). Therefore, in an initial phase, the location of the sneezing action and the start location of the sneeze droplets may be equivalent to one location. However, a difference between the location of the sneezing action and a location of the sneeze droplets gradually increases with time.

Optionally, a possible procedure for locating the first object and the second object includes the following. (a) Range-Doppler processing is performed on a received signal of each antenna, to generate a result shown in FIG. 7. A horizontal axis represents Doppler or a velocity, and a vertical axis represents a range. The range herein refers to a propagation range difference obtained through range estimation processing. (b) Incoherent accumulation (direct matrix superposition) is performed on a range-Doppler map obtained from a plurality of antennas, to increase a signal-to-noise ratio. A range-Doppler map is obtained through superposition. (c) The range-Doppler map obtained through superposition is detected, to determine a corresponding range of a moving object (for example, the first object or the second object) on the two-dimensional range-Doppler map. (d) Angle-of-arrival estimation is performed for all antennas. Further, a range corresponding to a moving target in a two-dimensional range-Doppler map of each antenna is selected, and angle-of-arrival estimation is performed for each antenna (because a wave path difference $d \sin \theta$ between plane waves arriving at different array elements has a conversion relationship with a propagation range difference, an angle of arrival $\theta$ is calculated). (e) A location (a spatial coordinate, or range and angle information of the moving target relative to the sending device and the receiving device) of the moving object (for example, the first object or the second object) is determined based on the estimated angle of arrival and range information.

S203: The first device performs angle-of-arrival estimation, range estimation, and Doppler estimation on the wireless signal, to obtain Doppler information of the wireless signal, where the Doppler information of the wireless signal is used for indicating impact of the first object and the second object on a frequency of the wireless signal.

Further, the first device performs signal processing such as angle-of-arrival estimation, range estimation, Doppler estimation, or multi-dimensional joint processing on the wireless signal, to obtain the Doppler information of the wireless signal. Subsequently, a sneezing action and sneeze droplets may be recognized in a related signal dimension based on the Doppler information of the wireless signal. The Doppler information of the wireless signal may be used for indicating the impact of the first object and the second object on the frequency of the wireless signal. The impact of the first object on the frequency of the wireless signal is different from the impact of the second object on the frequency of the wireless signal. In other words, a Doppler feature corresponding to the first object is different from a Doppler feature corresponding to the second object.

The Doppler information of the wireless signal may include Doppler information in a time-Doppler dimension, a range-Doppler-time dimension, or another dimension. Therefore, angle information (namely, an angle of arrival) and/or range information (namely, a propagation range difference) may also be required in a process of obtaining the Doppler information of the wireless signal. A person is used as an example. When the person walks or performs a corresponding action, a moving body generates Doppler modulation on a signal. In this case, corresponding analysis, such as time-frequency analysis, is performed on a received/collected signal. Time-varying Doppler features may be found in a time-Doppler dimension, and the features may correspond to a real body motion and can be used for further action recognition. Similarly, the droplets also have unique features that correspond to a real motion of the droplets. Therefore, the moving target (namely, the first object or the second object) has unique features in the time-Doppler dimension. In addition, the moving target may generate, in another dimension, corresponding information having a corresponding target motion feature. For example, time-varying range information may be indicated in a time-range dimension, and the information may also assist in subsequent sneezing action recognition and sneeze droplet recognition. There is also time-angle information, or information in other joint dimensions about the moving target, and the information may also assist in subsequent sneezing action recognition and sneeze droplet recognition.

S204: The first device obtains an attenuation spectrum or a wideband spectrum of the wireless signal, where the attenuation spectrum of the wireless signal is used for indicating impact of the first object on amplitude attenuation of the wireless signal, and the wideband spectrum of the wireless signal is used for indicating impact of the first object on wideband spectrum energy of the wireless signal.

Further, the first device may perform signal processing such as moving average on the wireless signal, and obtain an attenuation spectrum or a wideband spectrum of a wireless signal obtained through signal processing such as moving average. The attenuation spectrum of the wireless signal may be used for indicating the impact of the first object on amplitude attenuation of the wireless signal, and the wideband spectrum of the wireless signal is used for indicating the impact of the first object on wideband spectrum energy of the wireless signal. The attenuation spectrum may be information in a time-energy dimension, and the wideband spectrum may be information in a frequency-energy dimension or in a frequency-energy-time dimension.

Figure 9:
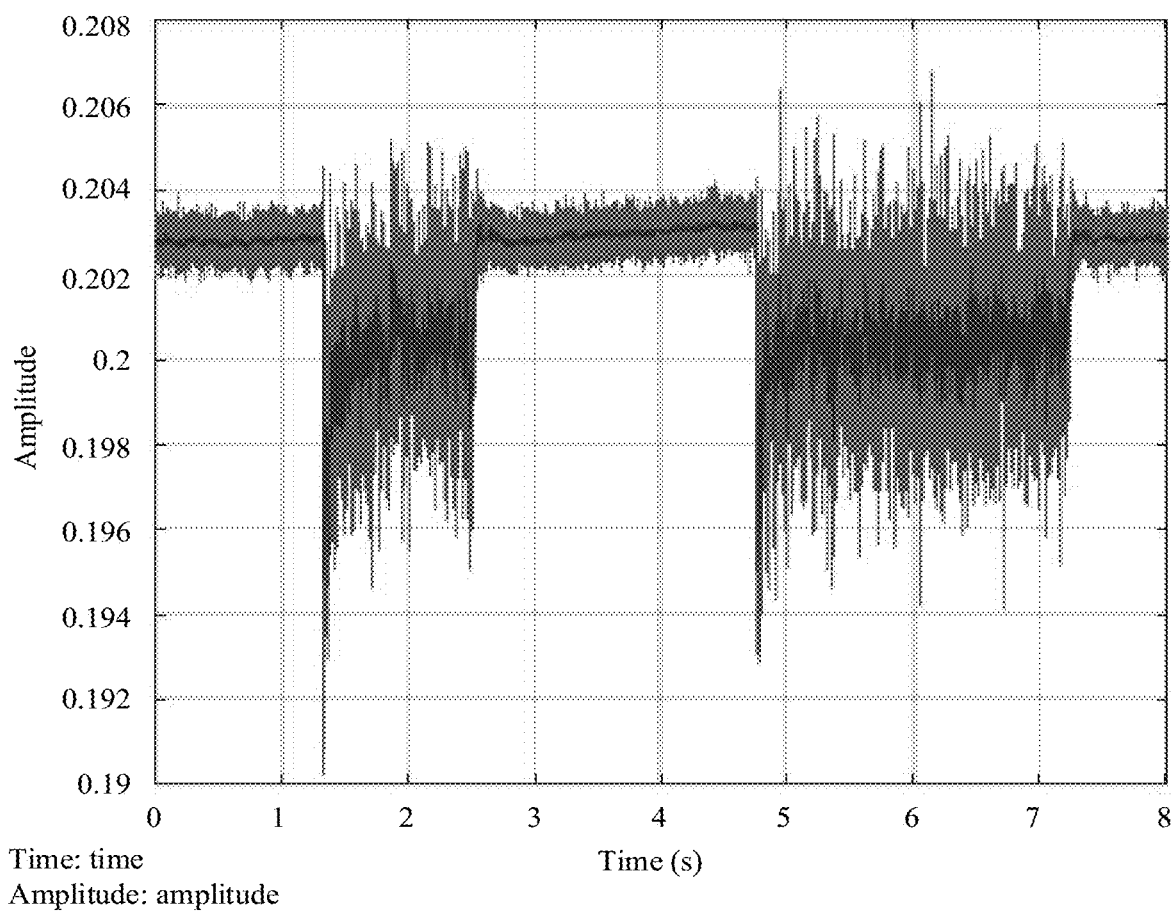
FIG. 9 is a schematic diagram of a signal attenuation spectrum according to an embodiment of this disclosure.

It may be understood that an attenuation spectrum of a signal refers to a change of an amplitude of the signal with time. When there are sneeze droplets/small water droplets, corresponding attenuation on the signal may be generated due to the sneeze droplets/the small water droplets. In this case, a corresponding trough in the amplitude is formed. The features can be used as input information for subsequent sneeze droplet recognition. FIG. 9 is a schematic diagram of a signal attenuation spectrum according to an embodiment of this disclosure. As shown in FIG. 9, a horizontal axis represents time, and a vertical axis represents received signal energy. It may be learned from FIG. 9 that a corresponding attenuation feature is generated at time points, such as 1.3 seconds (s) to 2.5 s, at which the sneeze droplets/small water droplets appear. A wideband spectrum of a signal refers to a wideband spectrum feature of the signal, that is, a horizontal axis represents a frequency, and a vertical axis represents energy of a corresponding frequency. Under a large bandwidth condition, different signals/electromagnetic waves passing through different media form different wideband spectrum features. Therefore, the wideband spectrum feature formed by the wireless signal passing through the sneeze droplets has specific features. In this way, the information can be used as input information for subsequent sneeze droplet recognition, to recognize and detect the sneeze droplets.

Optionally, step S202, step S203, and step S204 may be performed in parallel.

Alternatively, two of the three steps may be performed in parallel, and the other step may be performed before or after the two steps performed in parallel. The three steps may be performed in sequence. When the three steps are performed in sequence, a sequence may be: step S202, step S203, and step S204, or may be: step S202, step S204, and step S203, or may be: step S204, step S202, and step S203, or may be: step S204, step S203, and step S202, or may be: step S203, step S202, and step S204, or may be: step S203, step S204, and step S202.

S205: The first device determines, based on the Doppler information of the wireless signal and the attenuation spectrum/wideband spectrum of the wireless signal, whether the first object is the sneeze droplets and whether the second object is the sneezing action.

Further, after the Doppler information of the wireless signal and the attenuation spectrum/wideband spectrum of the wireless signal are obtained, information of the wireless signal in dimensions such as time-Doppler or range-time-Doppler and the attenuation spectrum (the information in the time-energy dimension) or the wideband spectrum (the information in the frequency-energy dimension or frequency-energy-time dimension) of the wireless signal may be input as a whole to a recognizer (a neural network or a non-neural network) for joint recognition, to recognize whether the second object is the sneezing action and whether the first object is the sneeze droplets. In other words, the process is described by using a convolutional neural network as an example. It is assumed that an input layer of the convolutional neural network is two-dimensional information (namely, a picture or a two-dimensional matrix). All feature information (namely, the Doppler information, and the attenuation spectrum or wideband spectrum of the wireless signal) may be extended to a two-dimensional matrix, and the matrix is input to the convolutional neural network. Feature extraction is performed by using a subsequent convolutional layer, and then classification is performed by using a classification layer. Finally, whether the sneezing action exists and whether the sneeze droplets are generated are determined.

It may be understood that complete information about the sneezing action and the sneeze droplets may be sensed based on the spatial location information determined in step S202.

Optionally, the first device may alternatively input a sneezing action recognition result (namely, whether the second object is the sneezing action) and a sneeze droplet recognition result (whether the first object is the sneeze droplets) to a subsequent decider, to provide information for final determining. In other words, the first device may separately perform two-dimensional neural network-based recognition based on various types of information (including the Doppler information, and attenuation spectrum or wideband spectrum information of the wireless signal), and perform determining based on a combination of obtained recognition results (namely, whether the sneezing action exists, whether Doppler features of the sneeze droplets exist, and whether attenuation features of the sneeze droplets exist). It may be understood that the first device may input the Doppler information of the wireless signal to a recognizer of a two-dimensional neural network for recognition, to output a recognition result, for example, whether the sneezing action exists and whether Doppler features of the sneeze droplets exist. The first device may input the attenuation spectrum or the wideband spectrum of the wireless signal to a recognizer of another two-dimensional neural network for recognition, to output a recognition result, for example, whether attenuation features of the sneeze droplets exist.

Figure 10:
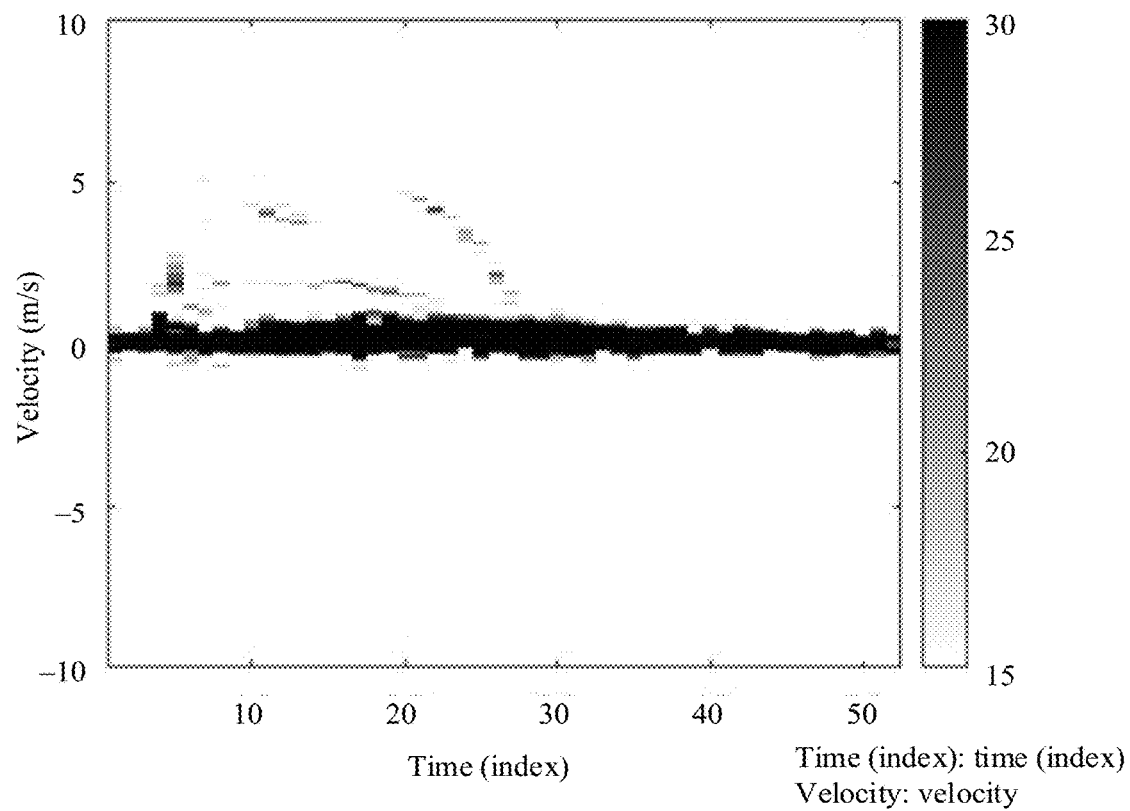
FIG. 10 is a schematic diagram of a Doppler measurement result of real sneezing according to an embodiment of this disclosure.

FIG. 10 is a schematic diagram of a Doppler measurement result of real sneezing according to an embodiment of this disclosure. During this measurement, a target person sitting relaxed in front of an experimental device (namely, a sending device and a receiving device herein) sneezes and generates sneeze droplets. In FIG. 10, a horizontal axis represents time, and a vertical axis represents a velocity. It can be learned that obvious velocity components exist at a location at which the velocity is 5 m/s or above. The velocity components are much larger than a normal moving velocity of a person. Therefore, whether sneeze droplets exist is determined through detection at a high-velocity location. In addition, the velocity components have unique time-velocity features, and the features may be used as valid input information for recognition, to further determine whether the sneeze droplets exist.

The recognition result output by the recognizer may be 2 bits in binary. For example, a most significant bit indicates whether the second object is the sneezing action, and a least significant bit indicates whether the first object is the sneeze droplets. For example, "10" indicates that the second object is the sneezing action and the first object is not the sneeze droplets, "11" indicates that the second object is the sneezing action and the first object is the sneeze droplets, "00" indicates that the second object is not the sneezing action and the first object is not the sneeze droplets. In this disclosure, the recognition result output by the recognizer may have three values: "00", "10", and "11". A result output by the decider is "1" only when the value is "11", and it indicates both the sneezing action and sneeze droplets exist.

Optionally, the first device may perform feature extraction and feature fusion on the Doppler information and the attenuation spectrum/wideband spectrum of the wireless signal, to obtain an input feature. The first device may input the input feature to a classifier for processing, and obtain a classification result output by the classifier, for example, the classification result is whether the first object is the sneeze droplets and the second object is the sneezing action. In other words, the first device may separately perform feature extraction on various types of information (including the Doppler information, and the attenuation spectrum or wideband spectrum of the wireless signal), and jointly input extracted signal features to a subsequent classification network for sneezing action recognition and sneeze droplet recognition, and finally, determine whether the sneezing action exists and whether the sneeze droplets are generated.

It may be understood that, in this embodiment of this disclosure, the sneeze droplets and the sneezing action are jointed recognized, to reduce a misjudgment caused by another external reason. For example, a feature of droplets emitted by a watering can or the like is similar to that of sneeze droplets during Doppler measurement. A misjudgment caused in such cases can be reduced based on the sneezing action recognition result. For another example, sneezing action recognition is performed during attenuation measurement, to reduce a misjudgment resulted from a similar attenuation spectrum caused by another reason. In addition, in this embodiment of this disclosure, both impact of the sneeze droplets on the Doppler information of the wireless signal and impact of the sneeze droplets on the attenuation spectrum/wideband spectrum of the wireless signal are considered. In other words, Doppler detection and attenuation detection are jointly used for comprehensively determining sneeze droplets. This further improves accuracy.

Figure 11:
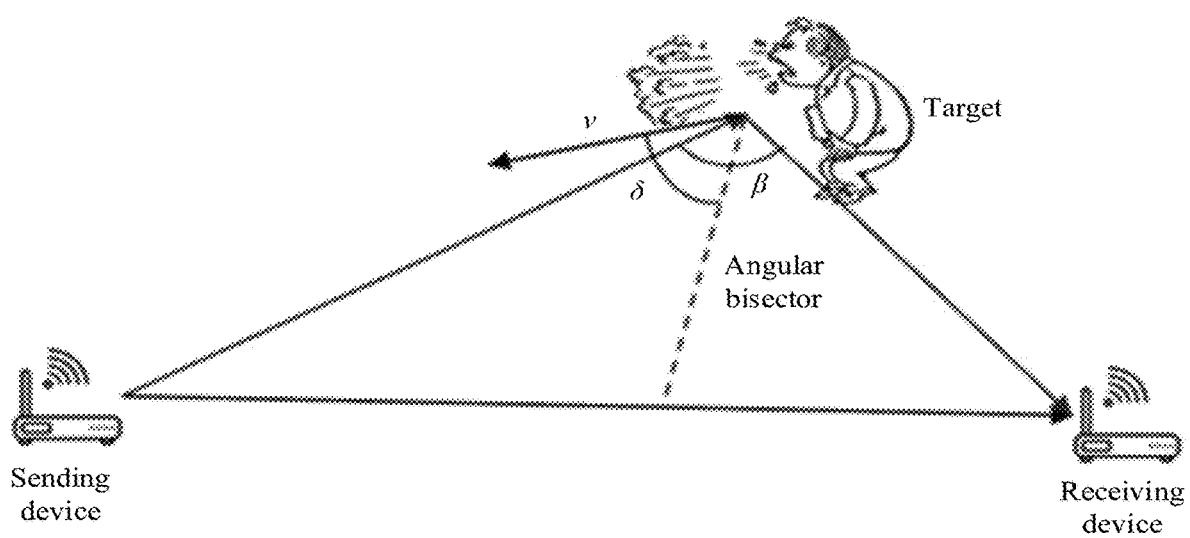
FIG. 11 is a schematic diagram of a relationship between Doppler and a bistatic angle according to an embodiment of this disclosure.

In addition, when the Doppler information of the wireless signal cannot be obtained, the sneeze droplets may be recognized based on the attenuation spectrum/wideband spectrum of the wireless signal. This can implement sneeze droplet recognition/sneezing sensing in all perspectives. A specific reason is as follows. FIG. 11 is a schematic diagram of a relationship between Doppler and a bistatic angle according to an embodiment of this disclosure. FIG. 11 shows a relationship between Doppler information that can be sensed by using a wireless signal and a bistatic angle β formed by a sending device, a target, and a receiving device. Doppler $f_d$ sensed by using the wireless signal and the bistatic angle β satisfy the following formula:

$$f_d = \frac{2v}{\lambda} \cos\delta \cos\left(\frac{\beta}{2}\right) \quad (2\text{-}1)$$

In the formula (2-1), v indicates a moving velocity of the target (for example, the first object or the second object), λ indicates a wavelength of a carrier, and δ indicates an angle between a moving direction of the target and an angular bisector of the bistatic angle β.

It can be understood that when the bistatic angle β is equal to 0°, a scenario in FIG. 11 is simplified to a single-static scenario, and Doppler that can be sensed by using the wireless signal reaches a maximum. When β approaches 180°, Doppler attenuation reaches minimum, and the target (namely, the first object or the second object) cannot be sensed by using Doppler. Therefore, sneeze droplet recognition/detection may be performed by analyzing the attenuation spectrum or the wideband spectrum of the wireless signal. Therefore, sneeze droplet recognition/sneezing sensing in all perspectives can be implemented based on a combination of the Doppler information and the attenuation spectrum of the wireless signal.

In an optional embodiment, after step S205, this embodiment of this disclosure further includes step S206: The first device outputs one or more of the following information: whether the first object is the sneeze droplets, whether the second object is the sneezing action, the spatial location information of the first object, or the spatial location information of the second object.

Figure 12:
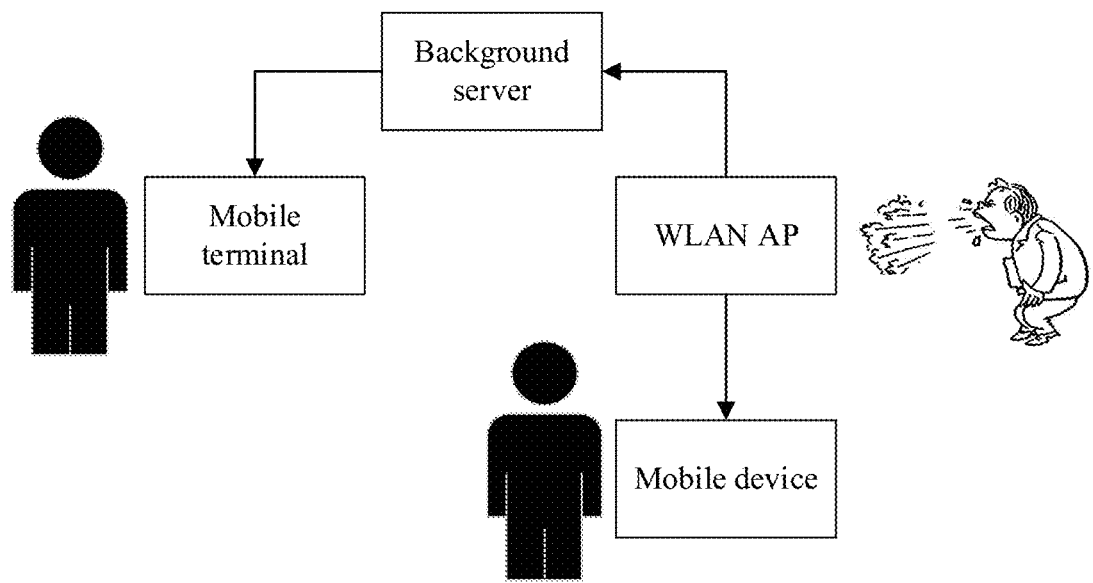
FIG. 12 is a schematic diagram of an information output scenario according to an embodiment of this disclosure.

Further, the first device may send, to a mobile device associated with the first device, one or more of the following information: whether the first object is the sneeze droplets, whether the second object is the sneezing action, the spatial location information of the first object, or the spatial location information of the second object. Optionally, the first device may alternatively upload, to a cloud, a recognition result and a locating result (whether the first object is the sneeze droplets, whether the second object is the sneezing action, the spatial location information of the first object, or the spatial location information of the second object) of the first device. The cloud reminds related personnel of avoidance or processing based on information such as a quantity of sneezing persons and a range of sneeze droplets. For example, surrounding personnel are reminded to avoid a sneeze droplet area, or cleaning personnel are reminded to clean the sneeze droplet area. FIG. 12 is a schematic diagram of an information output scenario according to an embodiment of this disclosure. As shown in FIG. 12, the first device is a WLAN AP. The WLAN AP may directly send information (the information determined in step S202 and step S205) to a mobile device, or may transmit the information to a background server. In this case, the background server notifies a mobile device of related information based on information such as a quantity of sneezing persons and a range of sneeze droplets.

Figure 13:
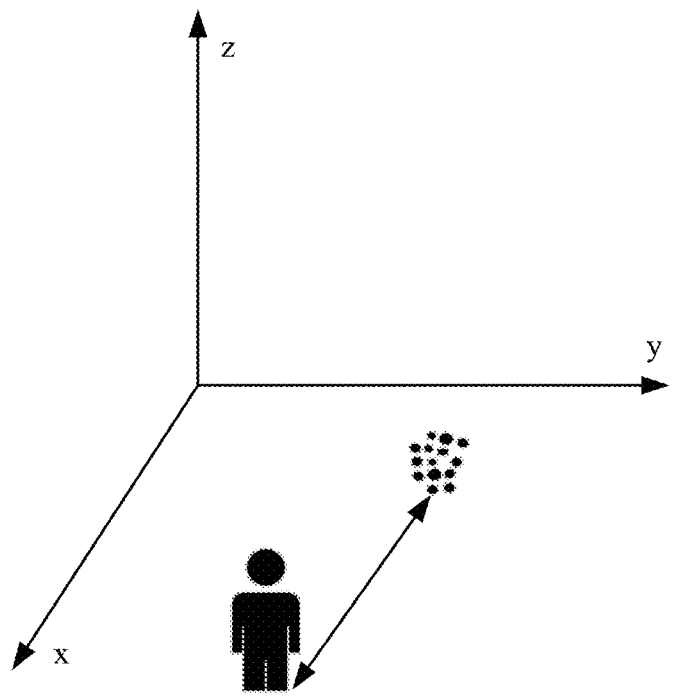
FIG. 13 is a schematic diagram of augmented reality (AR)-based related information notification according to an embodiment of this disclosure.

Optionally, the related information may be notified in a text push manner. Alternatively, the range of sneeze droplets may be marked by using technologies such as AR/VR for notification. FIG. 13 is a schematic diagram of AR-based related information notification according to an embodiment of this disclosure. As shown in FIG. 13, sizes and locations of a target person and sneeze droplets in an AR environment, and motion information (for example, a moving track) of the sneeze droplets may be virtualized on a mobile device by using a related technology such as AR.

In this embodiment of this disclosure, various types of information are output, to remind related personnel of an occurrence area and an impact range of sneeze droplets. This avoids a potential infection risk.

Figure 14:
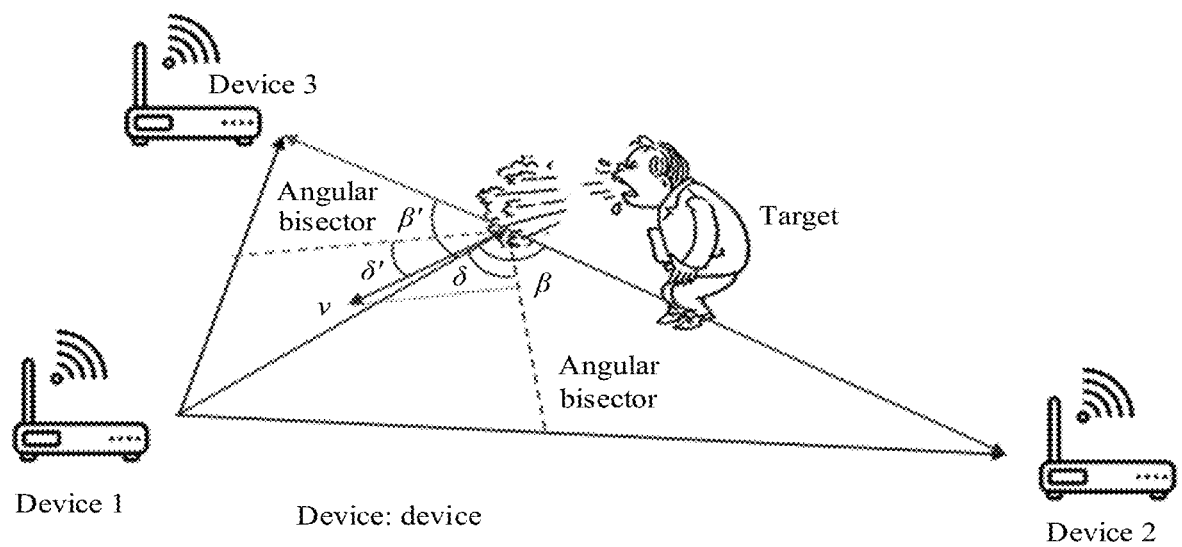
FIG. 14 is a schematic diagram of real velocity synthesis of sneeze droplets according to an embodiment of this disclosure.

It may be understood that a velocity of sneeze droplets observed by a single device is only a projection of an actual velocity of the sneeze droplets from a specific observation angle, and is not the actual velocity of the sneeze droplets. FIG. 14 is a schematic diagram of real velocity synthesis of sneeze droplets according to an embodiment of this disclosure. As shown in FIG. 14, two observation nodes are used as an example: a device 2 and a device 3. A device 1 is a device for sending a wireless signal, and the device 2 and the device 3 are devices for receiving/collecting the wireless signal. As shown in FIG. 14, according to the foregoing formula (2-1), a velocity $v_2$ observed by the device 2 may be obtained:

$$v_2 = \frac{f_d \lambda}{2\cos\delta \cos\left(\frac{\beta}{2}\right)} \quad (2\text{-}2)$$

In the formula (2-2), $f_d$ indicates Doppler sensed by the device 2 by using the wireless signal, β indicates a bistatic angle formed by the device 1, sneeze droplets, and the device 2, and δ indicates an angle between a moving direction of the sneeze droplets and an angular bisector of the bistatic angle β.

A velocity $v_3$ observed by the device 3 is:

$$v_3 = \frac{f_d' \lambda}{2\cos\delta' \cos\left(\frac{\beta'}{2}\right)} \quad (2\text{-}3)$$

In the formula (2-3), $f_d'$ indicates Doppler sensed by the device 3 by using the wireless signal, β' indicates a bistatic angle formed by the device 1, the sneeze droplets, and the device 3, and δ' indicates an angle between the moving direction of the sneeze droplets and an angular bisector of the bistatic angle β'.

Therefore, a real velocity and direction of the sneeze droplets may be synthesized based on a deployment location relationship between a plurality of devices and the velocities observed by the device 2 and the device 3. Further, a diffusion model of the sneeze droplets may be estimated well based on a motion model of the sneeze droplets, and an approximate impact range of the sneeze droplets may be determined.

Figure 15:
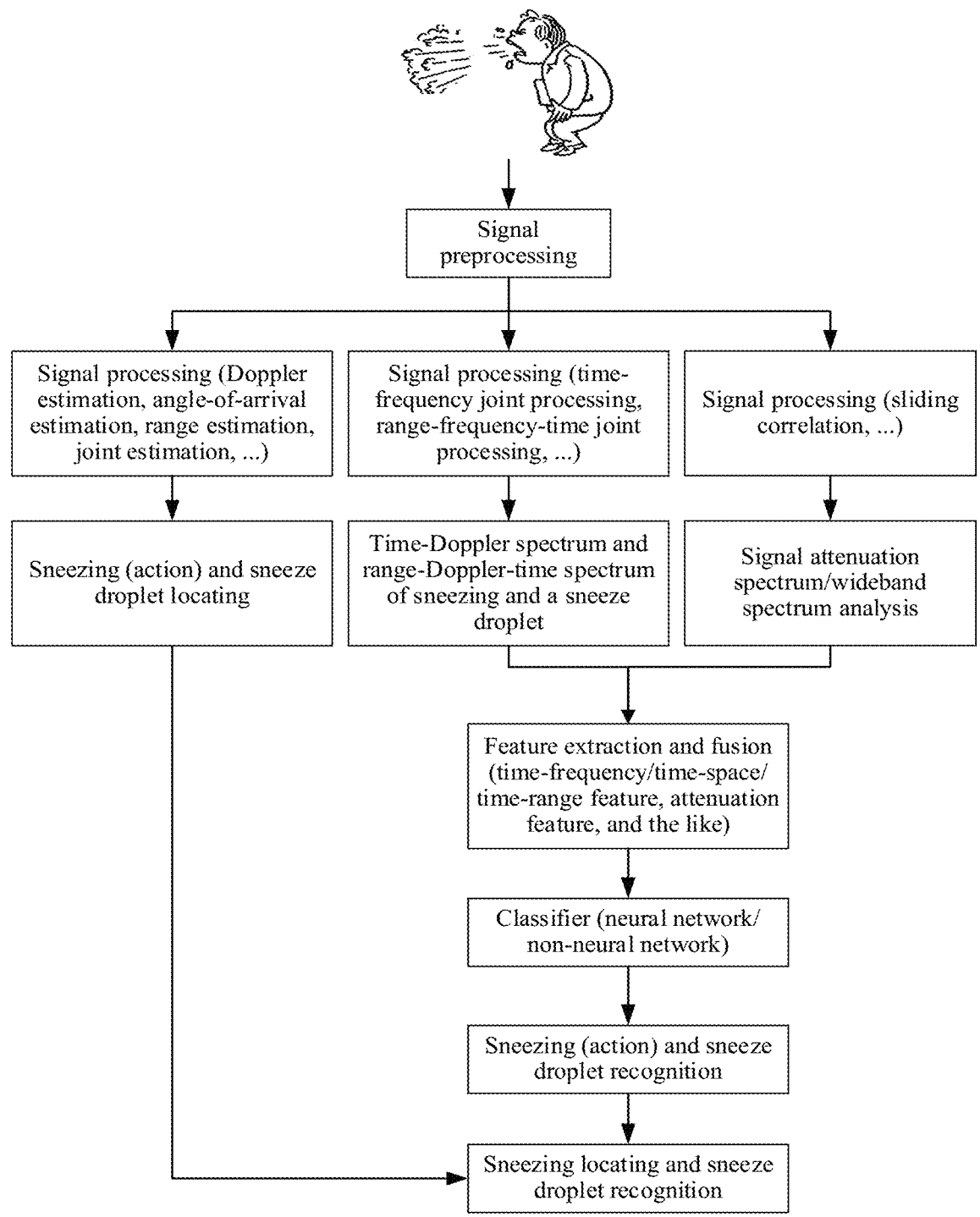
FIG. 15 is an example flowchart of a procedure according to an embodiment of this disclosure.

In another optional embodiment, to better understand the technical solutions in embodiments of this disclosure, the following describes the technical solutions in embodiments of this disclosure with reference to a possible procedure example in embodiments of this disclosure. FIG. 15 is an example flowchart of a procedure according to an embodiment of this disclosure. As shown in FIG. 15, after collecting a wireless signal, a WLAN device first performs signal preprocessing. The preprocessing includes a step such as filtering. After signal preprocessing, three types of processing are separately performed on a preprocessed signal. First processing is to locate sneezing (action) and sneeze droplets by performing signal processing steps such as Doppler estimation, angle-of-arrival estimation, range estimation, and joint estimation. Second processing is to obtain a time-Doppler spectrum and a range-Doppler-time spectrum of sneezing (action) and the sneeze droplets through time-frequency joint processing, range-frequency-time joint processing, and the like. Third processing is to analyze a signal attenuation spectrum/wideband spectrum through signal processing such as moving average. Feature extraction and feature fusion (including time-frequency/time-space/time-range features, attenuation features, and the like) are performed on results of the second processing and the third processing. Then, a result of feature extraction and feature fusion is input to a classifier (a neural network/non-neural network), to recognize sneezing (action) and the sneeze droplets. Finally, a locating result of the first processing and a detection result of the sneeze droplets are output, that is, sneezing locating and sneeze droplet detection.

In this embodiment of this disclosure, a received/collected wireless signal is first preprocessed, and then three types of processing are separately performed on a preprocessed wireless signal. First processing: Angle-of-arrival estimation, range estimation, and Doppler estimation are performed on the preprocessed wireless signal, to locate a sneezing action and sneeze droplets. Second processing: Angle-of-arrival estimation, range estimation, Doppler estimation, and multi-dimensional joint processing are performed on the preprocessed wireless signal, to detect/recognize the sneezing action and the sneeze droplets in a Doppler dimension or other joint dimensions. Third processing: An attenuation spectrum or a wideband spectrum of the preprocessed wireless signal is obtained. Finally, based on results of the three types of processing, the sneezing action and the sneeze droplets are located, and whether the sneeze droplets exist is determined. This can reduce a misjudgment, improve accuracy, and implement sneeze droplet recognition/sneezing sensing in all perspectives.

In still another optional embodiment, the method for sensing sneezing based on a wireless signal provided in this disclosure may be further applied to a multistatic joint sensing scenario or a sensing scenario including a plurality of sending devices and a plurality of receiving devices. It may be understood that multistatic in this disclosure may refer to a plurality of receiving devices.

Figure 16:
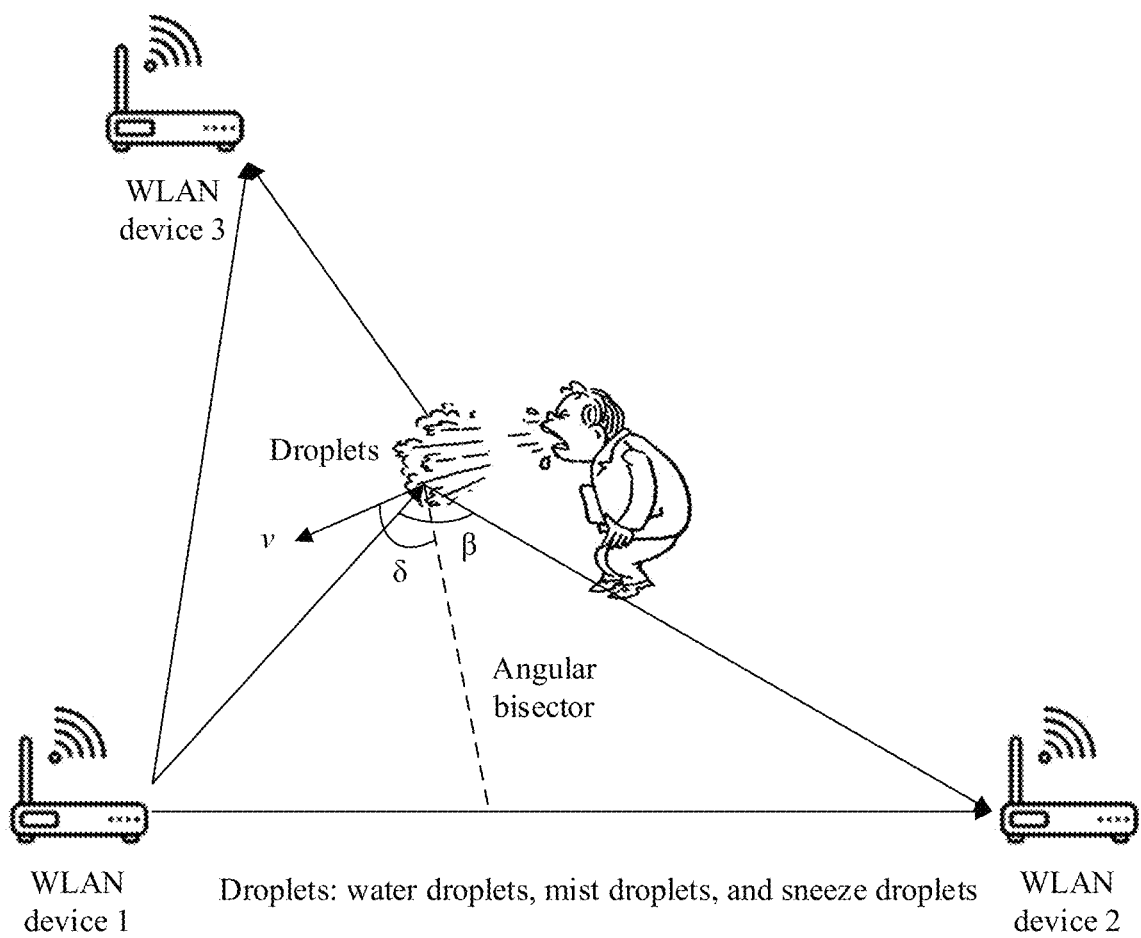
FIG. 16 is a schematic diagram of a multistatic joint sensing scenario according to an embodiment of this disclosure.

Further, FIG. 16 is a schematic diagram of a multistatic joint sensing scenario according to an embodiment of this disclosure. As shown in FIG. 16, three WLAN devices/nodes are used as an example: a WLAN device 1 (or a node 1), a WLAN device 2 (or a node 2), and a WLAN device 3 (or a node 3). In addition, a target person (for example, a target human in FIG. 16) is sneezing in space, and sneeze droplets are generated from sneezing. The WLAN device 1 sends a wireless signal. The wireless signal may arrive at the WLAN device 2 and the WLAN 3 through a line of sight, or after being reflected by the target human, or after being reflected by the sneeze droplets. A wireless signal received by the WLAN device 2 is superimposition of a line of sight signal from the WLAN device 1 to the WLAN device 2 and a plurality of reflection path signals. Similarly, a wireless signal received by the WLAN device 3 is superimposition of a line of sight signal from the WLAN device 1 to the WLAN device 3 and a plurality of reflection path signals. The WLAN device 2 and the WLAN device 3 may perform a plurality of types of signal processing on the wireless signal received by the WLAN device 2 and the wireless signal received by the WLAN device 3 respectively. Processing results of a plurality of nodes (for example, the WLAN device 2 and the WLAN device 3) are jointly used for locating and recognizing a sneezing action of a target object and sneeze droplets generated from sneezing. This can improve space gains and sensing efficiency.

Optionally, the WLAN device 2 and the WLAN device 3 may alternatively transmit the received wireless signals to a cloud computing center for processing, and the cloud computing center performs signal processing and the like on the wireless signals.

It may be understood that the WLAN device 1 may be a STA, and the WLAN device 2 and the WLAN device 3 may be APs.

A manner of processing the wireless signal by each node in the plurality of nodes is the same as a manner of processing the wireless signal by a single node. A difference lies in that, after obtaining Doppler information and an attenuation spectrum/wideband spectrum of the wireless signal, each node may send the information to a specific node. The node performs recognition and detection based on the Doppler information and attenuation spectrum/wideband spectrum of the wireless signal sent by each node, to determine whether there is a person sneezing in space and whether the sneeze droplets exist. The following uses a processing node as an example for ease of description. To be specific, each node sends the obtained Doppler information and attenuation spectrum/wideband spectrum of the wireless signal to a processing node. The following describes a possible processing process of the processing node. The processing node may be any node.

1. After receiving the Doppler information and the attenuation spectrum/wideband spectrum of the wireless signal that are sent by all nodes, the processing node may integrate related feature information from all the nodes into an information matrix, and input the matrix to a neural network, perform feature extraction by using a subsequent convolutional layer, and then perform classification by using a classification layer, and finally, determine whether the sneezing action exists and whether the sneeze droplets are generated. Optionally, complete information about the sneezing action and the sneeze droplets can be sensed based on locating information of all the nodes.

2. After receiving the Doppler information and the attenuation spectrum/wideband spectrum of the wireless signal that are sent by all nodes, the processing node may separately perform feature extraction on each information, and jointly input features from all the nodes to a subsequent classification network for sneezing action recognition and sneeze droplet recognition, and finally, determine whether the sneezing action exists and whether the sneeze droplets are generated. Optionally, complete information about the sneezing action and the sneeze droplets can be sensed based on locating information of all the nodes.

3. After receiving the Doppler information and the attenuation spectrum/wideband spectrum of the wireless signal that are sent by all nodes, the processing node may separately perform two-dimensional neural network-based recognition based on the information, and perform determining based on a combination of recognition results (whether the sneezing action exists and whether the sneeze droplets are generated) obtained by all the nodes.

In this embodiment of this disclosure, a plurality of nodes can jointly locate and recognize/detect the sneezing action and the sneeze droplets, and implement sneezing sensing in all perspectives. This can further improve space gains and sensing efficiency. If a sending node, a target (person), and a receiving node are in a straight line, a bistatic angle $\beta$ is equal to 180 degrees, and Doppler information cannot be obtained through measurement on the receiving node. In this case, one or more other receiving nodes may detect the Doppler information, to recognize the sneezing action and the sneeze droplets. This improves space gains and sensing efficiency. In addition, there is no need to obtain the attenuation spectrum of the wireless signal in some practical cases (for example, WLAN devices are deployed on rooftops in some actual scenarios). In this case, the bistatic angle $\beta$ is not equal to 180 degrees. In this embodiment of this disclosure, a plurality of nodes can still jointly locate and recognize/detect the sneezing action and the sneeze droplets in all perspectives.

Figure 17A:
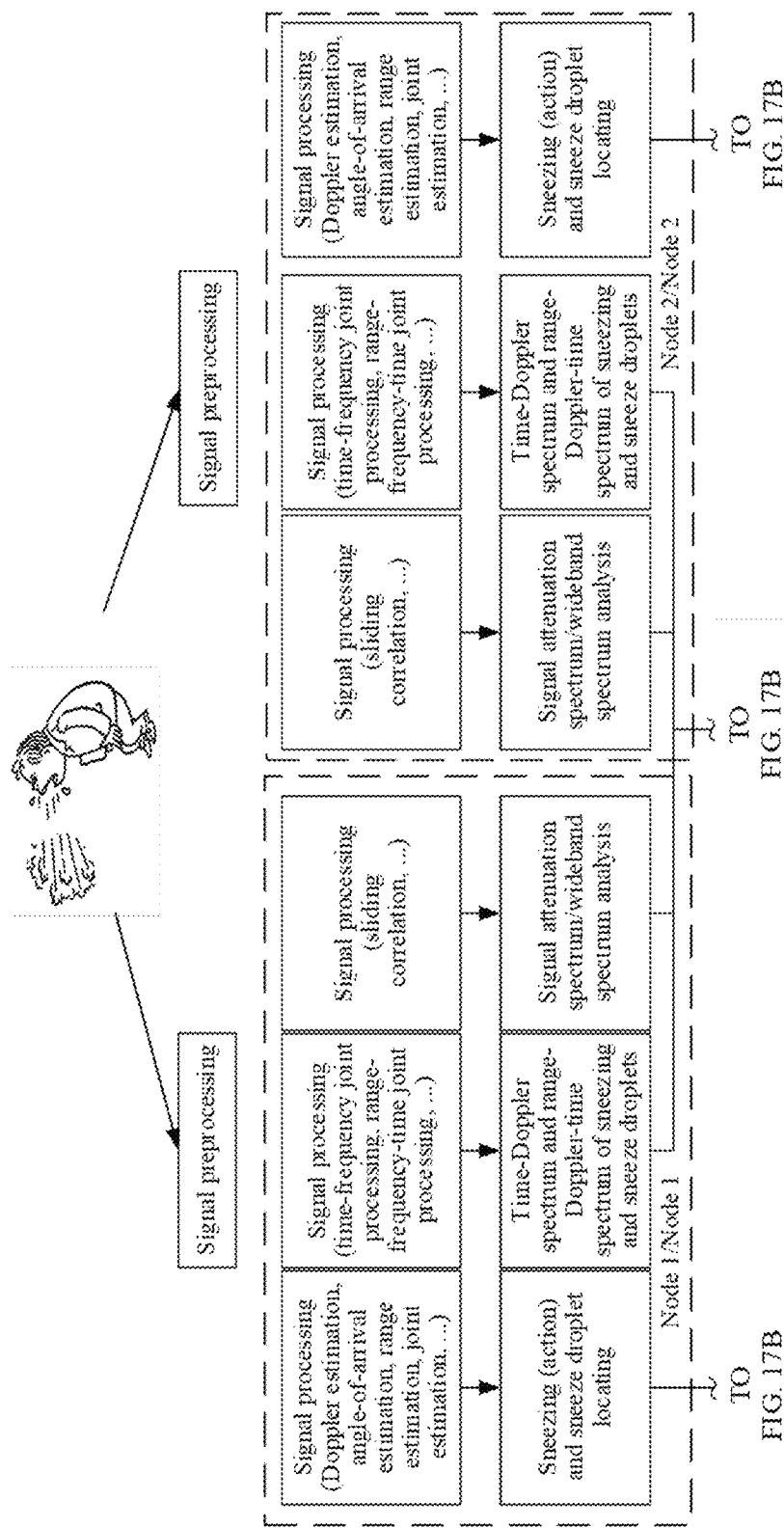
FIG. 17A and FIG. 17B are an example flowchart of another procedure according to an embodiment of this disclosure.
Figure 17B:
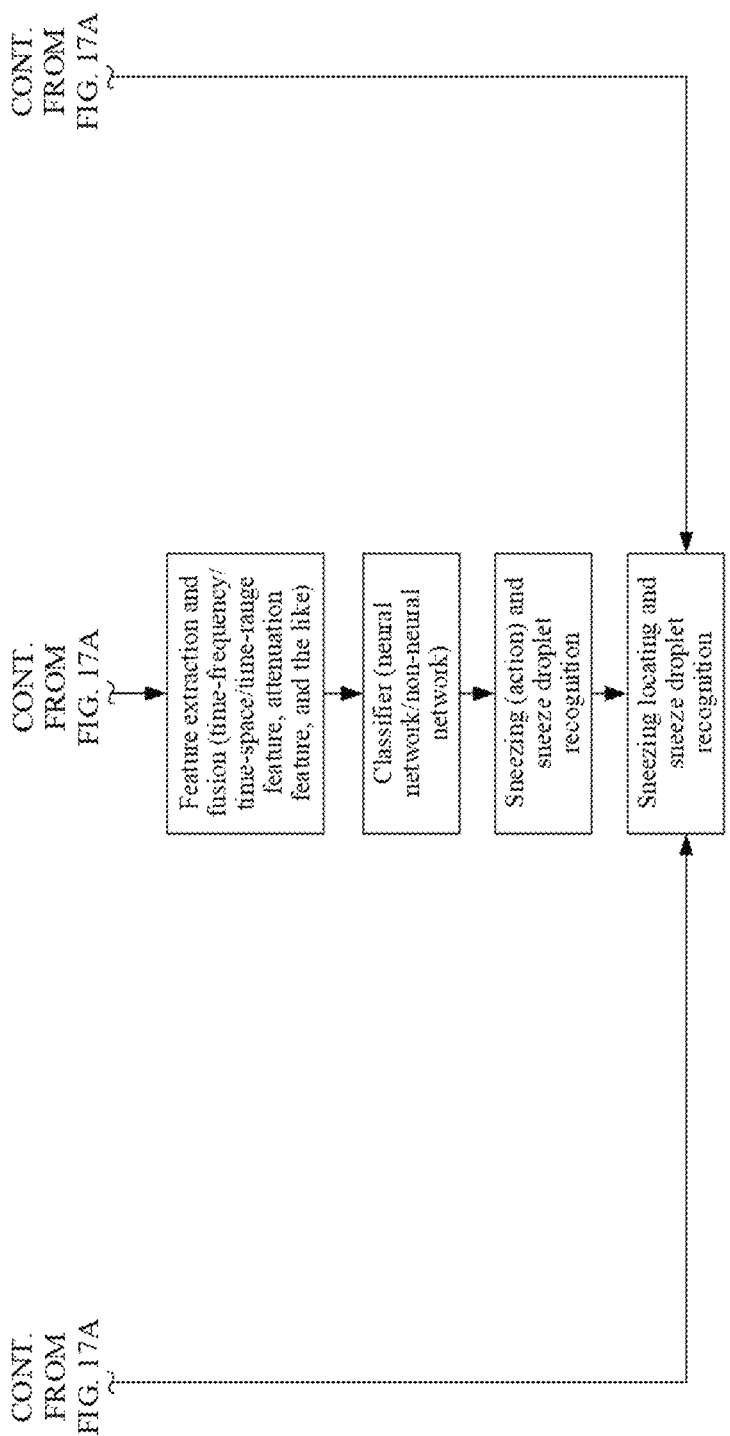

To better understand the method for sensing sneezing based on a wireless signal provided in an embodiment of this disclosure in the multistatic sensing scenario, refer to FIG. 17A and FIG. 17B. FIG. 17A and FIG. 17B are an example flowchart of another procedure according to an embodiment of this disclosure. As shown in FIG. 17A and FIG. 17B, a node 1 and a node 2 each collect a wireless signal, and perform signal preprocessing on the wireless signals collected by the node 1 and the node 2 respectively. The preprocessing includes a step such as filtering. After signal preprocessing, the node 1 and the node 2 each perform three types of processing on a preprocessed signal. First processing is to locate sneezing (action) and sneeze droplets by performing signal processing steps such as Doppler estimation, angle-of-arrival estimation, range estimation, and joint estimation. Second processing is to obtain a time-Doppler spectrum and a range-Doppler-time spectrum of sneezing (action) and the sneeze droplets through time-frequency joint processing, range-frequency-time joint processing, and the like. Third processing is to analyze a signal attenuation spectrum/wideband spectrum through signal processing such as moving average. The node 1 and/or the node 2 each send/sends results of the second processing and the third processing to a processing node. The processing node may be either of the node 1 and the node 2. The processing node performs feature extraction and feature fusion (including time-frequency/time-space/time-range features, attenuation features, and the like) on the results of the second processing and the third processing performed by each of the node 1 and the node 2, and then, input a result of feature extraction and feature fusion to a classifier (a neural network/non-neural network), to recognize sneezing (action) and sneeze droplets, to finally output a locating result of the first processing and a detection result of the sneeze droplets, that is, sneezing locating and sneeze droplet detection.

The method for sensing sneezing based on a wireless signal in embodiments of this disclosure is described in detail above. To better implement the solutions in embodiments of this disclosure, an embodiment of this disclosure further provides a corresponding apparatus or device.

Figure 18:
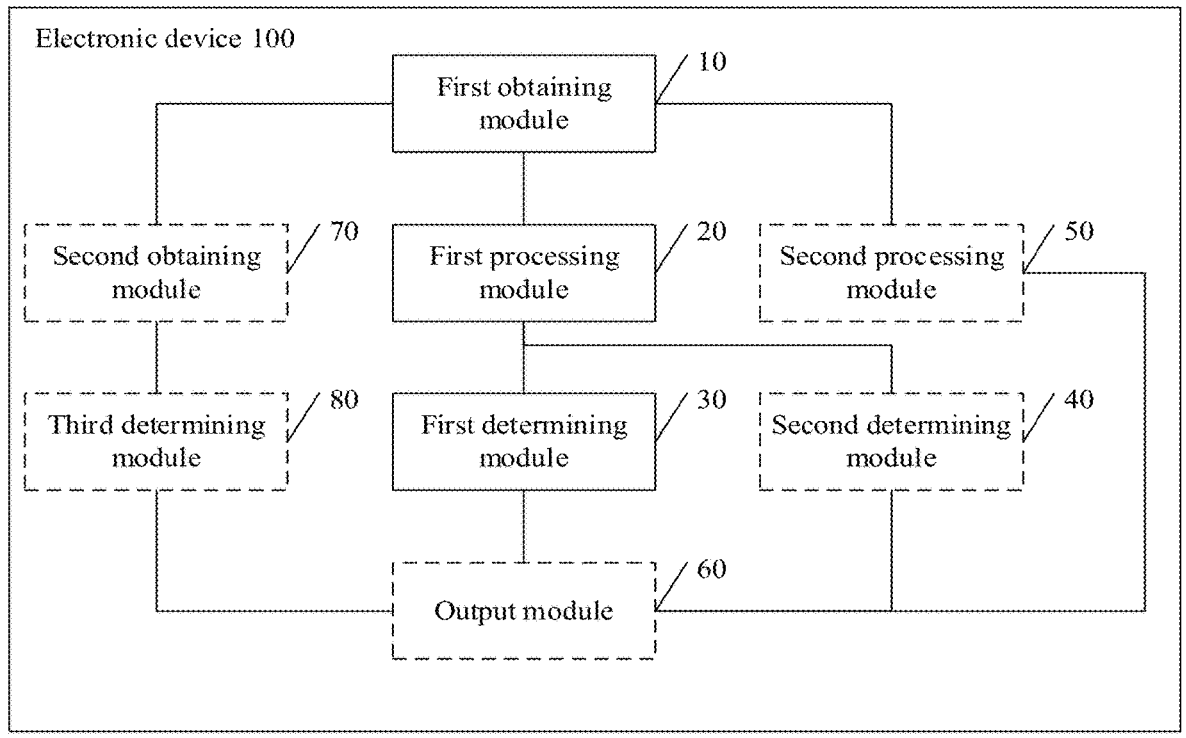
FIG. 18 is a schematic diagram of a structure of an electronic device according to an embodiment of this disclosure.

FIG. 18 is a schematic diagram of a structure of an electronic device according to an embodiment of this disclosure. The electronic device may be an AP or a STA in a WLAN, or may be a chip, a processing system, or a circuit installed in the AP or the STA, or may be a cloud computing center. As shown in FIG. 18, the electronic device 100 may include a first obtaining module 10 configured to obtain a wireless signal, where the wireless signal propagates in space including a first object, a first processing module 20 configured to perform Doppler estimation on the wireless signal, to obtain Doppler information of the wireless signal, where the Doppler information of the wireless signal is used for indicating impact of the first object on a frequency of the wireless signal, and a first determining module 30 configured to determine, based on the Doppler information of the wireless signal, whether the first object is sneeze droplets.

Optionally, the wireless signal may further propagate in space including a second object. The Doppler information of the wireless signal is further used for indicating impact of the second object on the frequency of the wireless signal. The impact of the first object on the frequency of the wireless signal is different from the impact of the second object on the frequency of the wireless signal. The electronic device 100 further includes a second determining module 40. The second determining module 40 is configured to determine, based on the Doppler information of the wireless signal, whether the second object is a sneezing action. The first determining module 30 and the second determining module 40 may be a same module, or may be different modules.

Optionally, the electronic device 100 may further include a second processing module 50. The second processing module 50 is configured to perform angle-of-arrival estimation, range estimation, and Doppler estimation on the wireless signal, to obtain spatial location information of the first object and spatial location information of the second object. The spatial location information of the first object includes a first angle of arrival of a wireless signal that is reflected by the first object and that is relative to a receiving device, and a first range between the first object and the receiving device. The spatial location information of the second object includes a second angle of arrival of a wireless signal that is reflected by the second object and that is relative to the receiving device, and a second range between the second object and the receiving device.

Optionally, the electronic device 100 may further include an output module 60. The output module 60 is configured to output one or more of the following information: whether the first object is the sneeze droplets, whether the second object is the sneezing action, the spatial location information of the first object, or the spatial location information of the second object.

Optionally, the electronic device 100 may further include a second obtaining module 70 and a third determining module 80. The second obtaining module 70 is configured to obtain an attenuation spectrum or a wideband spectrum of the wireless signal. The attenuation spectrum of the wireless signal is used for indicating impact of the first object on amplitude attenuation of the wireless signal. The wideband spectrum of the wireless signal is used for indicating impact of the first object on wideband spectrum energy of the wireless signal. The third determining module 80 is configured to determine, based on the Doppler information of the wireless signal and the attenuation spectrum or wideband spectrum of the wireless signal, whether the first object is the sneeze droplets.

Optionally, the first determining module 30 is further configured to perform feature extraction on the Doppler information of the wireless signal, to obtain a first input feature, and input the first input feature to a classification model for processing, to output a classification result. The classification result is whether the first object is the sneeze droplets.

Optionally, the first determining module 30 is further configured to input the Doppler information of the wireless signal to a classification model for processing, to output a classification result. The classification result is whether the first object is the sneeze droplets.

Optionally, the first determining module 30 is further configured to divide the Doppler information of the wireless signal into first Doppler information and second Doppler information, where a spread of the first Doppler information in Doppler frequency domain is less than a spread of the second Doppler information in Doppler frequency domain, input the first Doppler information to a first recognizer for recognition, to recognize whether the second object is the sneezing action, input the second Doppler information to a second recognizer for recognition, to recognize whether the second Doppler information includes a Doppler feature of the first object, and input information about whether the second object is the sneezing action and whether the second Doppler information includes the Doppler feature of the first object to a decider, to determine whether the first object is the sneeze droplets.

The first obtaining module 10, the first processing module 20, the first determining module 30, the second determining module 40, the second processing module 50, the second obtaining module 70, and the third determining module 80 may be integrated into one module, for example, a processing module. The output module 60 may alternatively be a transceiver module.

In specific implementation, for implementation of the foregoing modules or units, refer to corresponding descriptions of the first device in the embodiment shown in FIG. 4 or FIG. 8, to perform the method and the function performed by the first device in any one of the foregoing embodiments.

The electronic device 100 provided in this embodiment of this disclosure may perform the method for sensing sneezing based on a wireless signal performed by the first device. For a specific implementation process and beneficial effects of the method, refer to descriptions in any one of the foregoing embodiments. Details are not described herein again.

Figure 19:
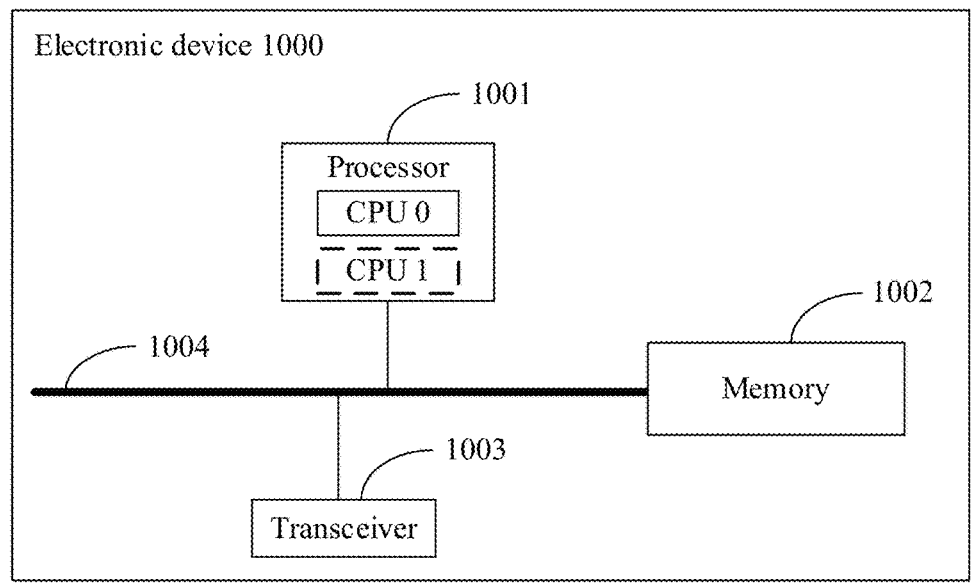
FIG. 19 is a schematic diagram of another structure of an electronic device according to an embodiment of this disclosure.

FIG. 19 is a schematic diagram of another structure of an electronic device according to an embodiment of this disclosure. As shown in FIG. 19, an electronic device 1000 provided in this embodiment of this disclosure includes a processor 1001, a memory 1002, and a bus system 1004. Optionally, the electronic device 1000 may further include a transceiver 1003. The processor 1001, the memory 1002, and the transceiver 1003 are connected through the bus system 1004.

The processor 1001 is configured to obtain a wireless signal, where the wireless signal propagates in space including a first object, perform Doppler estimation on the wireless signal, to obtain Doppler information of the wireless signal, where the Doppler information of the wireless signal is used for indicating impact of the first object on a frequency of the wireless signal, and determine, based on the Doppler information of the wireless signal, whether the first object is sneeze droplets.

The transceiver 1003 may be configured to output one or more of the following information: whether the first object is the sneeze droplets, whether a second object is a sneezing action, spatial location information of the first object, or spatial location information of the second object.

The memory 1002 is configured to store a program. Further, the program may include program code, and the program code includes computer operation instructions. The memory 1002 includes but is not limited to a random-access memory (RAM), a read-only memory (ROM), an erasable programmable ROM (EPROM), or a compact disc (CD) ROM (CD-ROM). Only one memory is shown in FIG. 19. Certainly, a plurality of memories may be disposed as required. The memory 1002 may alternatively be a memory in the processor 1001. This is not limited herein.

The memory 1002 stores the following elements, executable units or data structures, or subsets or extended sets thereof: operation instructions: including various operation instructions, used for implementing various operations, and operating systems including various system programs, used for implementing various basic services and process a hardware-based task.

The processor 1001 controls an operation of the electronic device 1000. The processor 1001 may be one or more central processing units (CPUs). When the processor 1001 is one CPU, the CPU may be a single-core CPU, or may be a multi-core CPU.

In a specific application, the components of the electronic device 1000 are coupled through the bus system 1004, and the bus system 1004 may further include a power bus, a control bus, a status signal bus, and the like in addition to a data bus. However, various buses in FIG. 19 are marked as the bus system 1004 for clear description. FIG. 19 is merely schematically illustrated for ease of representation.

Optionally, through cooperation of the processor 1001, the memory 1002, and the transceiver 1003, the electronic device 1000 shown above may further perform the method for sensing sneezing based on a wireless signal performed by the first device.

Optionally, an embodiment of this disclosure further provides a computer program product. The computer program product includes computer program code. When the computer program code is run on a computer, the computer is enabled to perform the method steps of the first device described in FIG. 4 or FIG. 8.

The computer program code in the computer program product may be executed, for example, by the processor 1001 in the electronic device 1000 shown in FIG. 19, to control the transceiver 1003, so that the transceiver 1003 cooperates in performing the method for sensing sneezing based on a wireless signal in any one of the foregoing embodiments.

Functions of the computer program product may be implemented by using hardware or software. When the functions are implemented by using software, the functions may be stored in a computer-readable storage medium or transmitted as one or more instructions or code in the computer-readable storage medium.

Optionally, an embodiment of this disclosure further provides a computer-readable storage medium. The computer-readable storage medium stores computer program code. When the processor executes the computer program code, the electronic device performs the method in any one of the foregoing embodiments. The computer-readable storage medium may be an internal memory in the electronic device 1000 shown in FIG. 19, or an external memory connected to the electronic device 1000.

Optionally, an embodiment of this disclosure further provides an apparatus. The apparatus may exist in a product form of a chip. A structure of the apparatus includes a processing circuit and an interface circuit. The processing circuit is configured to perform the method in any one of the foregoing embodiments, and the interface circuit is configured to communicate with another apparatus.

The electronic device, the computer-readable storage medium, the computer program product, and the chip in embodiments of this disclosure may perform the method for sensing sneezing based on a wireless signal in any one of the foregoing embodiments. For a specific implementation process and beneficial effects thereof, refer to the foregoing method embodiment. Details are not described herein again.

Method or algorithm steps described in combination with the content disclosed in this disclosure may be implemented by hardware, or may be implemented by a processor by executing software instructions. The software instructions may include a corresponding software module. The software module may be stored in a RAM, a flash memory, an EPROM, an electrically EPROM (EEPROM), a register, a hard disk, a removable hard disk, a CD-ROM, or any other form of storage medium well-known in the art. For example, a storage medium is coupled to a processor, so that the processor can read information from the storage medium or write information into the storage medium. Certainly, the storage medium may be further a component of the processor. The processor and the storage medium may be located in an application-specific integrated circuit (ASIC). In addition, the ASIC may be located in a core network interface device. Certainly, the processor and the storage medium may exist in the core network interface device as discrete components.

A person of skill in the art should be aware that in one or more of the foregoing examples, the functions described in this disclosure may be implemented by using hardware, software, firmware, or any combination thereof. When the functions are implemented by software, the foregoing functions may be stored in a computer-readable medium or transmitted as one or more instructions or code in the computer-readable medium. The computer-readable medium includes a computer-readable storage medium and a communication medium. The communication medium includes any medium that facilitates transmission of a computer program from one place to another. The storage medium may be any available medium accessible to a general-purpose or special-purpose computer.

In the foregoing specific implementations, the objectives, technical solutions, and beneficial effects of this disclosure are further described in detail. It should be understood that the foregoing descriptions are merely specific implementations of this disclosure, but are not intended to limit the protection scope of this disclosure. Any modification, equivalent replacement, improvement, or the like made based on the technical solutions of this disclosure shall fall within the protection scope of this disclosure.

What is claimed is:

1. A method comprising:
obtaining a first wireless signal that propagates in a space comprising a first object and a second object;
performing a first Doppler estimation on the first wireless signal to obtain Doppler information of the first wireless signal, wherein the Doppler information indicates a first impact of the first object on a frequency of the first wireless signal;
performing an angle of arrival estimation on the first wireless signal and a range estimation on the first wireless signal to obtain first spatial location information of the first object and second spatial location information of the second object; and
determining, based on the Doppler information, the first spatial location information, and the second spatial location information, whether the first object comprises sneeze droplets and whether the second object comprises a sneezing action.

2. The method of claim 1, wherein the Doppler information further indicates a second impact of the second object on the frequency, and wherein the first impact is different from the second impact.

3. The method of claim 2, wherein the first spatial location information comprises a first angle of arrival of a second wireless signal that is reflected by the first object and that is relative to a receiving device and comprises a first range between the first object and the receiving device, and wherein the second spatial location information comprises a second angle of arrival of a third wireless signal that is reflected by the second object and that is relative to the receiving device and comprises a second range between the second object and the receiving device.

4. The method of claim 3, further comprising outputting first information indicating one or more of the following:
whether the first object comprises the sneeze droplets;
whether the second object comprises the sneezing action;
the first spatial location information; or
the second spatial location information.

5. The method of claim 4, further comprising sending the first information to a related mobile device.

6. The method of claim 4, further comprising uploading the first information to a cloud computing center.

7. The method of claim 1, wherein after obtaining the first wireless signal, the method further comprises:
obtaining an attenuation spectrum of the first wireless signal, wherein the attenuation spectrum indicates a second impact of the first object on an amplitude attenuation of the first wireless signal; and
further determining, based on the attenuation spectrum, whether the first object comprises the sneeze droplets.

8. The method of claim 1, wherein after obtaining the first wireless signal, the method further comprises:
obtaining a wideband spectrum of the first wireless signal, wherein the wideband spectrum indicates a second impact of the first object on a wideband spectrum energy of the first wireless signal; and
further determining, based on the wideband spectrum, whether the first object comprises the sneeze droplets.

9. An electronic device comprising:
a memory configured to store instructions; and
a processor coupled to the memory and configured to execute the instructions to cause the electronic device to:
obtain a first wireless signal that propagates in a space comprising a first object and a second object;
perform a first Doppler estimation on the first wireless signal to obtain Doppler information of the first wireless signal, wherein the Doppler information indicates a first impact of the first object on a frequency of the first wireless signal;
perform an angle of arrival estimation on the first wireless signal and a range estimation on the first wireless signal to obtain first spatial location information of the first object and second spatial location information of the second object; and
determine, based on the Doppler information, the first spatial location information, and the second spatial location information, whether the first object comprises sneeze droplets and whether the second object comprises a sneezing action.

10. The electronic device of claim 9, wherein the Doppler information further indicates a second impact of the second object on the frequency, and wherein the first impact is different from the second impact.

11. The electronic device of claim 10, wherein the first spatial location information comprises a first angle of arrival of a second wireless signal that is reflected by the first object and that is relative to a receiving device and comprises a first range between the first object and the receiving device, and wherein the second spatial location information comprises a second angle of arrival of a third wireless signal that is reflected by the second object and that is relative to the receiving device and comprises a second range between the second object and the receiving device.

12. The electronic device of claim 11, wherein the processor is further configured to execute the instructions to cause the electronic device to output one or more of the following information:
whether the first object comprises the sneeze droplets;
whether the second object comprises the sneezing action;
the first spatial location information; or
the second spatial location information.

13. The electronic device of claim 9, wherein the processor is further configured to execute the instructions to cause the electronic device to:
obtain an attenuation spectrum of the first wireless signal, wherein the attenuation spectrum indicates a second impact of the first object on an amplitude attenuation of the first wireless signal; and
further determine, based on the attenuation spectrum, whether the first object comprises the sneeze droplets.

14. The electronic device of claim 9, wherein the processor is further configured to execute the instructions to cause the electronic device to:
obtain a wideband spectrum of the first wireless signal, wherein the wideband spectrum indicates a second impact of the first object on a wideband spectrum energy of the first wireless signal; and
further determine, based on the wideband spectrum, whether the first object comprises the sneeze droplets.

15. A chip system comprising:
a processing circuit configured to:
obtain a first wireless signal that propagates in a space comprising a first object and a second object;
perform a first Doppler estimation on the first wireless signal to obtain Doppler information of the first wireless signal, wherein the Doppler information indicates a first impact of the first object on a frequency of the first wireless signal;
perform an angle of arrival estimation on the first wireless signal and a range estimation on the first wireless signal to obtain first spatial location information of the first object and second spatial location information of the second object; and
determine, based on the Doppler information, the first spatial location information, and the second spatial location information, whether the first object comprises sneeze droplets and whether the second object comprises a sneezing action.

16. The chip system of claim 15, wherein the Doppler information further indicates a second impact of the second object on the frequency, and wherein the first impact is different from the second impact.

17. The chip system of claim 16, wherein the first spatial location information comprises a first angle of arrival of a second wireless signal that is reflected by the first object and that is relative to a receiving device and comprises a first range between the first object and the receiving device, and wherein the second spatial location information comprises a second angle of arrival of a third wireless signal that is reflected by the second object and that is relative to the receiving device and comprises a second range between the second object and the receiving device.

18. The chip system of claim 17, wherein the processing circuit is further configured to output one or more of the following information:
whether the first object comprises the sneeze droplets;
whether the second object comprises the sneezing action;
the first spatial location information; or
the second spatial location information.

19. The chip system of claim 15, wherein the processing circuit is further configured to:
obtain an attenuation spectrum of the first wireless signal, wherein the attenuation spectrum indicates a second impact of the first object on an amplitude attenuation of the first wireless signal; and
further determine, based on the attenuation spectrum, whether the first object comprises the sneeze droplets.

20. The chip system of claim 15, wherein the processing circuit is further configured to:
obtain a wideband spectrum of the first wireless signal, wherein the wideband spectrum indicates a second impact of the first object on a wideband spectrum energy of the first wireless signal; and
further determine, based on the wideband spectrum, whether the first object comprises the sneeze droplets.

* * * * *